United States Patent
McKinley et al.

(10) Patent No.: US 12,307,272 B2
(45) Date of Patent: May 20, 2025

(54) APPARATUSES, COMPUTER-IMPLEMENTED METHODS, AND COMPUTER PROGRAM PRODUCTS FOR IMPROVED SELECTION AND PROVISION OF OPERATIONAL SUPPORT DATA OBJECTS

(71) Applicant: Assurant, Inc., New York, NY (US)

(72) Inventors: Scott McKinley, Westlake, OH (US); Rachita Singh, Westlake, OH (US); Nathaniel Ripoli, Westlake, OH (US)

(73) Assignee: ASSURANT, INC., New York, NY (US)

( * ) Notice: Subject to any disclaimer, the term of this patent is extended or adjusted under 35 U.S.C. 154(b) by 0 days.

(21) Appl. No.: 18/090,179

(22) Filed: Dec. 28, 2022

(65) Prior Publication Data
US 2023/0214244 A1    Jul. 6, 2023

Related U.S. Application Data

(60) Provisional application No. 63/266,214, filed on Dec. 30, 2021.

(51) Int. Cl.
*G06F 9/451*    (2018.01)
*G06F 11/07*    (2006.01)
(Continued)

(52) U.S. Cl.
CPC ............ *G06F 9/453* (2018.02); *G06F 11/079* (2013.01); *G06Q 30/015* (2023.01);
(Continued)

(58) Field of Classification Search
CPC .. G06F 9/453; G06F 11/079; G06F 16/24575; G06F 16/335; G06Q 30/015; H04L 12/2823
See application file for complete search history.

(56) References Cited

U.S. PATENT DOCUMENTS

| | | | | |
|---|---|---|---|---|
| 6,020,886 A | * | 2/2000 | Jacober | G06F 9/453 715/709 |
| 6,021,403 A | * | 2/2000 | Horvitz | G06N 5/00 706/45 |

(Continued)

OTHER PUBLICATIONS

Cai et al., Bayesian Networks in Fault Diagnosis, IEEE Transactions on Industrial Informatics, vol. 13, Issue 5, Oct. 2017.
(Continued)

*Primary Examiner* — Justin R. Blaufeld
(74) *Attorney, Agent, or Firm* — ALSTON & BIRD LLP

(57) ABSTRACT

Embodiments of the present disclosure provide for identification and output of improved predicted operational support data object(s). Embodiments utilize particular data sets and data model implementations to identify and select predicted operational support data object(s) determined as associated with the highest confidence to assist in resolving a particular malfunction affecting a networked device in a dynamic home communications network. Such embodiments enable resolution of the malfunction, utilizing the predicted operational support data object(s), with improved success rates and without requiring performance of additional and/or alternative support processes.

16 Claims, 14 Drawing Sheets

(51) Int. Cl.
  *G06Q 30/015* (2023.01)
  *G06F 16/2457* (2019.01)
  *G06F 16/335* (2019.01)
  *H04L 12/28* (2006.01)

(52) U.S. Cl.
  CPC ...... *G06F 16/24575* (2019.01); *G06F 16/335* (2019.01); *H04L 12/2823* (2013.01)

(56) References Cited

U.S. PATENT DOCUMENTS

| | | | | |
|---|---|---|---|---|
| 6,452,607 | B1* | 9/2002 | Livingston | G06F 3/04895 715/705 |
| 6,651,053 | B1* | 11/2003 | Rothschild | G06F 16/9554 707/960 |
| 6,657,643 | B1* | 12/2003 | Horvitz | G06Q 10/109 715/764 |
| 6,694,314 | B1* | 2/2004 | Sullivan | G06F 16/90344 |
| 6,806,906 | B1* | 10/2004 | Soga | H04N 23/675 348/333.03 |
| 7,024,658 | B1* | 4/2006 | Cohen | G06F 9/453 715/705 |
| 7,493,325 | B1* | 2/2009 | Bhatnagar | G06F 16/30 707/999.102 |
| 7,669,125 | B2 | 2/2010 | Smirnov | G06F 3/0481 715/708 |
| 7,904,400 | B2* | 3/2011 | Bussert | G06F 9/453 706/14 |
| 8,219,115 | B1* | 7/2012 | Nelissen | G06F 9/54 455/418 |
| 8,566,718 | B1* | 10/2013 | O'Neill | G09B 5/067 703/22 |
| 8,655,952 | B1* | 2/2014 | Schilit | G06F 9/453 709/204 |
| 10,949,432 | B1* | 3/2021 | Grayson | G06F 16/9035 |
| 2002/0093525 | A1* | 7/2002 | Asauchi | H04L 41/5064 715/714 |
| 2005/0050096 | A1* | 3/2005 | Gomes | G06Q 10/06 |
| 2005/0097396 | A1* | 5/2005 | Wood | G06F 11/2252 714/25 |
| 2005/0268234 | A1* | 12/2005 | Rossi | G06F 9/453 715/705 |
| 2006/0206715 | A1* | 9/2006 | Cowan | H04L 63/306 713/176 |
| 2006/0242607 | A1* | 10/2006 | Hudson | G06F 3/04817 715/863 |
| 2007/0220365 | A1* | 9/2007 | Castellani | G06Q 10/00 714/46 |
| 2008/0091454 | A1* | 4/2008 | Fisher, Jr. | G06Q 10/10 705/301 |
| 2008/0294423 | A1* | 11/2008 | Castellani | G06F 16/3329 704/4 |
| 2009/0106224 | A1* | 4/2009 | Roulland | G06F 16/3325 707/999.005 |
| 2009/0112598 | A1* | 4/2009 | Williams | H04L 41/5061 704/270 |
| 2010/0093319 | A1* | 4/2010 | Sherman | H04M 3/42178 455/414.1 |
| 2010/0174599 | A1* | 7/2010 | Rosenblatt | G06Q 30/0641 705/14.37 |
| 2010/0287275 | A1* | 11/2010 | Inoue | G06F 9/453 709/224 |
| 2011/0021234 | A1* | 1/2011 | Tibbitts | H04W 8/22 455/517 |
| 2011/0099474 | A1* | 4/2011 | Grossman | G06F 9/453 715/810 |
| 2011/0270771 | A1* | 11/2011 | Coursimault | H04N 1/00344 705/304 |
| 2011/0273589 | A1* | 11/2011 | Mochimizo | H04N 23/68 348/E5.024 |
| 2011/0294520 | A1* | 12/2011 | Zhou | H04W 8/02 455/456.1 |
| 2012/0101888 | A1* | 4/2012 | Rothschild | G06Q 30/0623 705/26.61 |
| 2012/0117470 | A1* | 5/2012 | Michelstein | G09B 19/0053 715/709 |
| 2012/0199645 | A1* | 8/2012 | Rothschild | G06F 16/951 235/375 |
| 2014/0006944 | A1* | 1/2014 | Selig | G06F 9/453 715/705 |
| 2014/0052645 | A1 | 2/2014 | Hawes et al. | |
| 2014/0075304 | A1* | 3/2014 | Bailey | G06F 9/453 715/705 |
| 2014/0075312 | A1* | 3/2014 | Dingsor | G06F 16/438 715/716 |
| 2014/0229860 | A1* | 8/2014 | Rogers | G06Q 10/06311 715/753 |
| 2016/0203726 | A1* | 7/2016 | Hibbs | A61B 5/165 434/308 |
| 2017/0315825 | A1* | 11/2017 | Gordon | G06F 3/0346 |
| 2017/0316707 | A1* | 11/2017 | Lawrenson | A61B 5/16 |
| 2018/0007204 | A1* | 1/2018 | Klein | H04M 3/5166 |
| 2018/0121808 | A1* | 5/2018 | Ramakrishna | H04L 51/02 |
| 2018/0164963 | A1* | 6/2018 | Ku | G06F 3/04842 |
| 2018/0246740 | A1* | 8/2018 | Maemura | G06F 3/1205 |
| 2018/0285775 | A1 | 10/2018 | Bergen | |
| 2019/0018883 | A1* | 1/2019 | Wang | G06F 16/2457 |
| 2019/0324778 | A1* | 10/2019 | Bhowmick | G06F 9/453 |
| 2020/0152304 | A1* | 5/2020 | Chang | G10L 25/63 |
| 2021/0099336 | A1* | 4/2021 | Li | H04L 41/0636 |
| 2021/0157985 | A1* | 5/2021 | Rotkop | G06F 40/205 |
| 2022/0300392 | A1* | 9/2022 | Biswas | G06F 11/3438 |

OTHER PUBLICATIONS

Outgoing—ISA/210—International Search Report Mailed on Apr. 21, 2023 for WO Application No. PCT/US22/082473, 9 page(s).

* cited by examiner

APPARATUSES, COMPUTER-IMPLEMENTED METHODS, AND COMPUTER PROGRAM PRODUCTS FOR IMPROVED SELECTION AND PROVISION OF OPERATIONAL SUPPORT DATA OBJECTS

CROSS-REFERENCE TO RELATED APPLICATIONS

This application claims priority to U.S. Provisional Application No. 63/266,214, filed Dec. 30, 2021, the contents of which are incorporated herein by reference in their entireties.

TECHNOLOGICAL FIELD

Embodiments of the present disclosure generally relate to providing operational support data object(s) for malfunction(s) for one or more device(s), and specifically to applying device activity data and malfunction text description data to an operational support processing data model to select at least a predicted operational support data object for outputting via a client device.

BACKGROUND

For any of a myriad of reasons, a device, system, network, and/or other configuration of computing devices may experience any number of technical problems affecting its operation. Such problems may include decreased performance, crashes, lack of connectivity, and the like. Users of such devices, or associated with such devices, often will seek resources, methods, processes, and other means for diagnosing and resolving such technical problems. Applicant has discovered problems with current implementations for identifying and resolving technical problems for any number of devices, and with providing resources for assisting in resolving such technical problems. Through applied effort, ingenuity, and innovation, Applicant has solved many of these identified problems by developing embodied in the present disclosure, which are described in detail below.

BRIEF SUMMARY

In general, embodiments of the present disclosure provided herein provide improved operational support data object(s) corresponding to particular malfunction(s). Other implementations for providing improved operational support data object(s) corresponding to particular malfunction(s) will be, or will become, apparent to one with skill in the art upon examination of the following figures and detailed description. It is intended that all such additional implementations be included within this description be within the scope of the disclosure, and be protected by the following claims.

In accordance with a first aspect of the present disclosure, a computer-implemented method for using device activity data from a dynamic home communication network to select a predicted operational support data object from an operational support management repository is provided. The computer-implemented method is executable via any number of computing devices embodied in hardware, software, firmware, and/or a combination thereof as described herein. In one example, the example computer-implemented method includes initiating a malfunction support session associated with a requesting client device. The example computer-implemented method further includes correlating device activity data and malfunction text description data to the malfunction support session. The example computer-implemented method further includes applying, in real-time, the device activity data and the malfunction text description data to an operational support processing data model to select the predicted operational support data object from the operational support management repository, where the operational support processing data model is trained based on training device activity data and malfunction history data from the operational support management repository. The example computer-implemented method further includes outputting, in real-time, the predicted operational support data object to the requesting client device.

Additionally or alternatively, in some example embodiments, the example computer-implemented method further includes receiving, via the requesting client device, user input requesting initiation of the malfunction support session, where the predicted operational support data object is outputted in response to receiving the user input requesting initiation of the malfunction support session.

Additionally or alternatively, in some example embodiments, the example computer-implemented method further includes receiving, via the requesting client device, user input engaging the operational support data object; and terminating initiation of the malfunction support session in response to receiving the user input engaging the operational support data object.

Additionally or alternatively, in some example embodiments, the example computer-implemented method further includes receiving updated malfunction text description data in response to user input updating the malfunction text description data; automatically applying, in real-time, the device activity data and the updated malfunction text description data to the operational support processing data model upon receiving malfunction text description data to select an updated predicted operational support data object from the operational support management repository; and outputting the updated predicted operational support data object to the requesting client device.

Additionally or alternatively, in some example embodiments, the example computer-implemented method further includes receiving support search data associated with the malfunction support session, where the support search data is further applied to the operational support processing data model to select the predicted operational support data object.

Additionally or alternatively, in some example embodiments, outputting, in real-time, the predicted operational support data object to the requesting client device includes causing rendering, to the requesting client device, of a support user interface comprising a first sub-interface associated with a main support transmission process and a second sub-interface comprising the predicted operational support data object.

Additionally or alternatively, in some example embodiments, the example computer-implemented method further includes identifying an operational support data object set; identifying a training device activity data; and training the operational support processing data model for: identifying a possible malfunction classification identifier set based at least on the training device activity data; and associating each possible malfunction classification identifier of the possible malfunction classification identifier set with at least a portion of the operational support data object set.

Additionally or alternatively, in some example embodiments, the dynamic home communication network comprises a plurality of networked devices associated with a plurality of networked device types, and where the operational support processing data model selects the predicted operational support data object based at least in part on the plurality of networked device types.

Additionally or alternatively, in some example embodiments, the device activity data indicates a plurality of malfunctions represented by a plurality of malfunction classification identifiers, and where the predicted operational support data object is associated with a first malfunction classification identifier representing a first malfunction of the plurality of malfunctions that contributes to each other malfunction of the plurality of malfunctions.

Additionally or alternatively, in some example embodiments, the example computer-implemented method further includes identifying a user profile associated with the requesting client device; and determining, based at least in part on the user profile, the device activity data comprising at least device identification data for one or more networked devices associated with the dynamic home communications network.

Additionally or alternatively, in some example embodiments, initiating the malfunction support session associated with the requesting client device further comprises initiating a process for establishing a connection between the requesting client device and a technician device associated with a technical representative, where the predicted operational support data object is output before establishing the connection.

Additionally or alternatively, in some example embodiments, the example computer-implemented method further includes terminating the process for establishing the connection between the requesting client device and the technician device in response to receiving the user input engaging the operational support data object.

In accordance with a second aspect of the present disclosure, an apparatus using device activity data from a dynamic home communication network to select a predicted operational support data object from an operational support management repository is provided. In one example embodiment of the apparatus, the example apparatus includes at least one processor and at least one memory having computer-coded instructions stored thereon. The computer-coded instructions, in execution with the at least one processor, causes the apparatus to perform any one of the example computer-implemented methods described herein. In another example embodiment of the apparatus, the apparatus includes means for performing each operation of any one of the example computer-implemented methods described herein.

In accordance with a third aspect of the present disclosure, a computer program product using device activity data from a dynamic home communication network to select a predicted operational support data object from an operational support management repository is provided. In one example embodiment of the computer program product, the example computer program product includes at least one non-transitory computer-readable storage medium having computer program code stored thereon. The computer program code, in execution with at least one processor, configures the computer program product for performing any one of the example computer-implemented methods described herein.

BRIEF DESCRIPTION OF THE DRAWINGS

Figure 1:
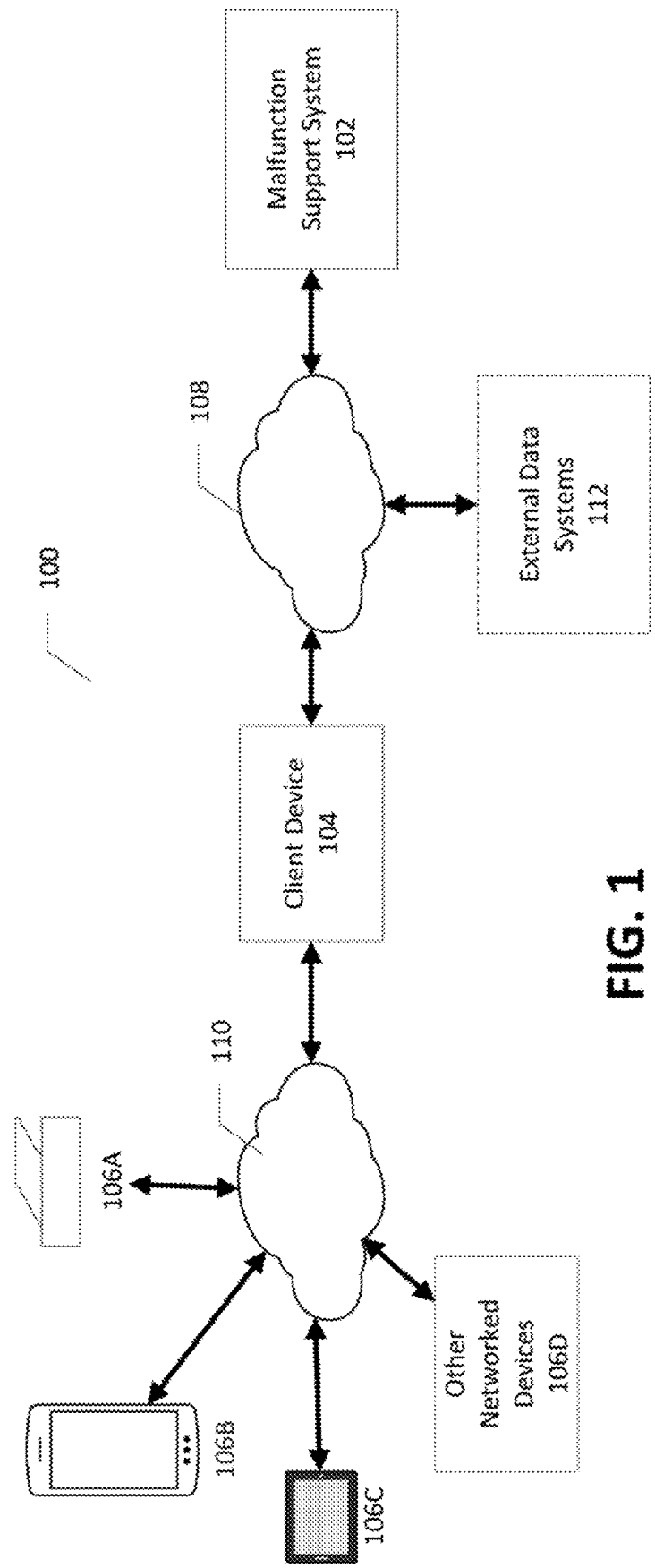
Figure 2:
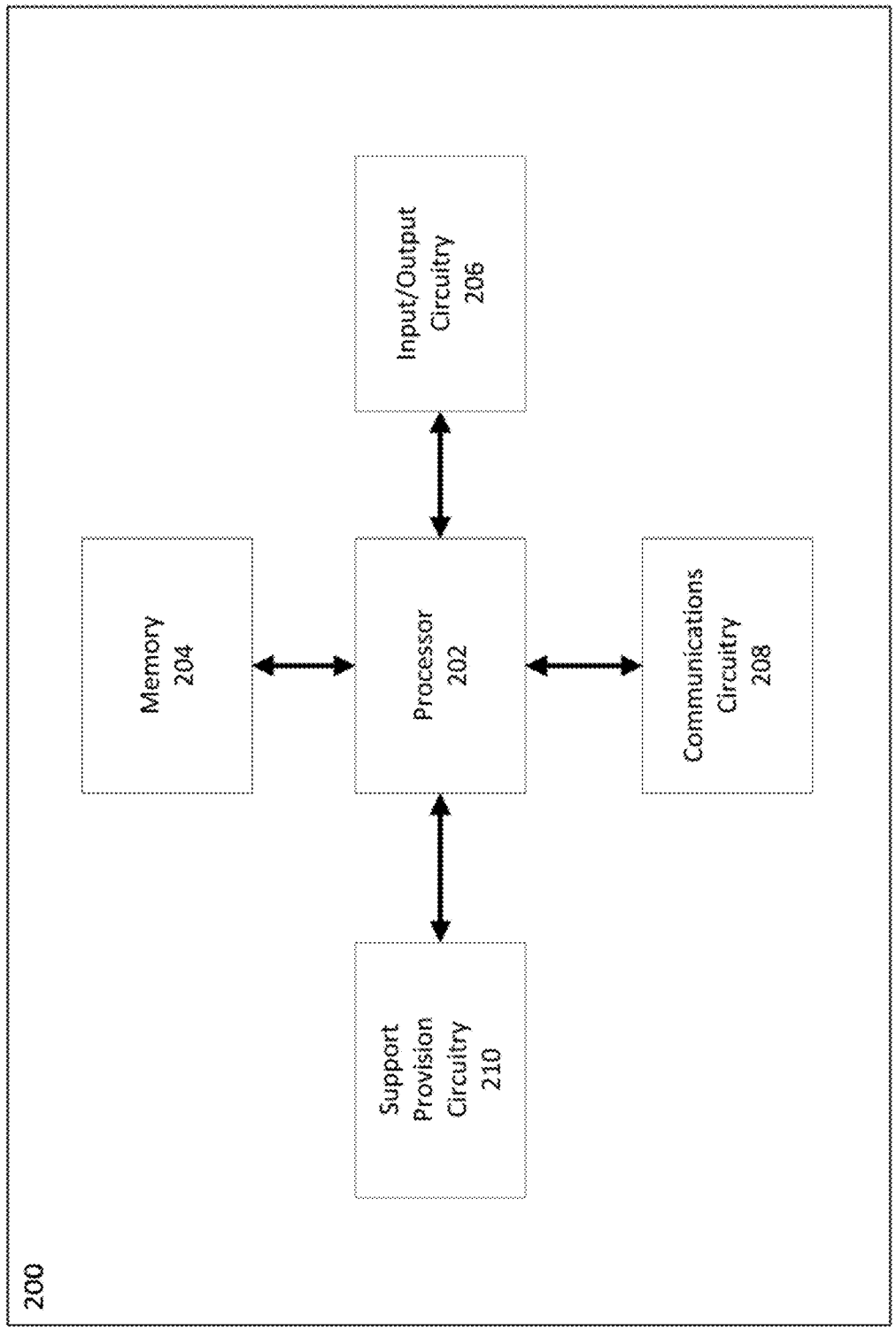
Figure 3:
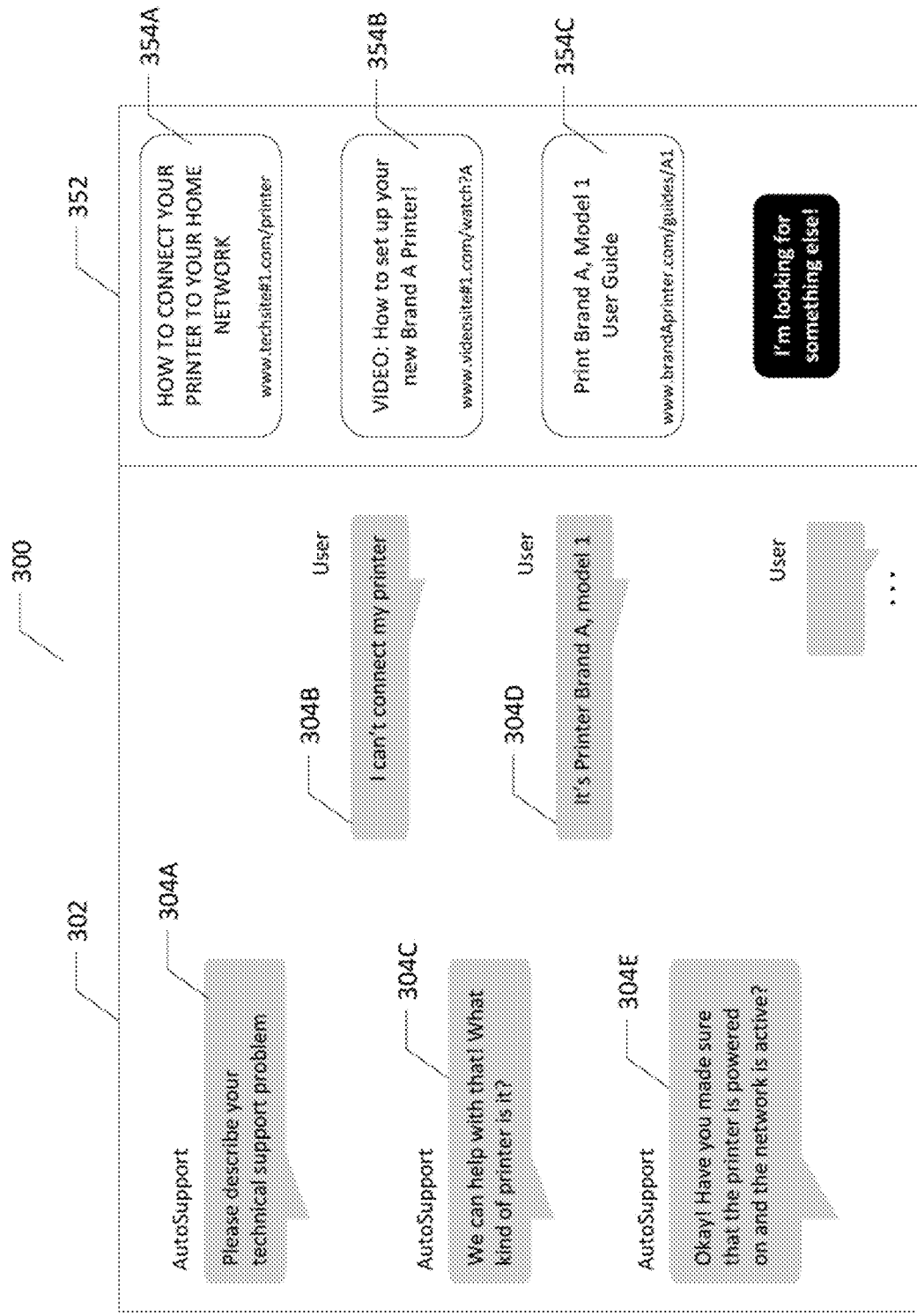
Figure 4:
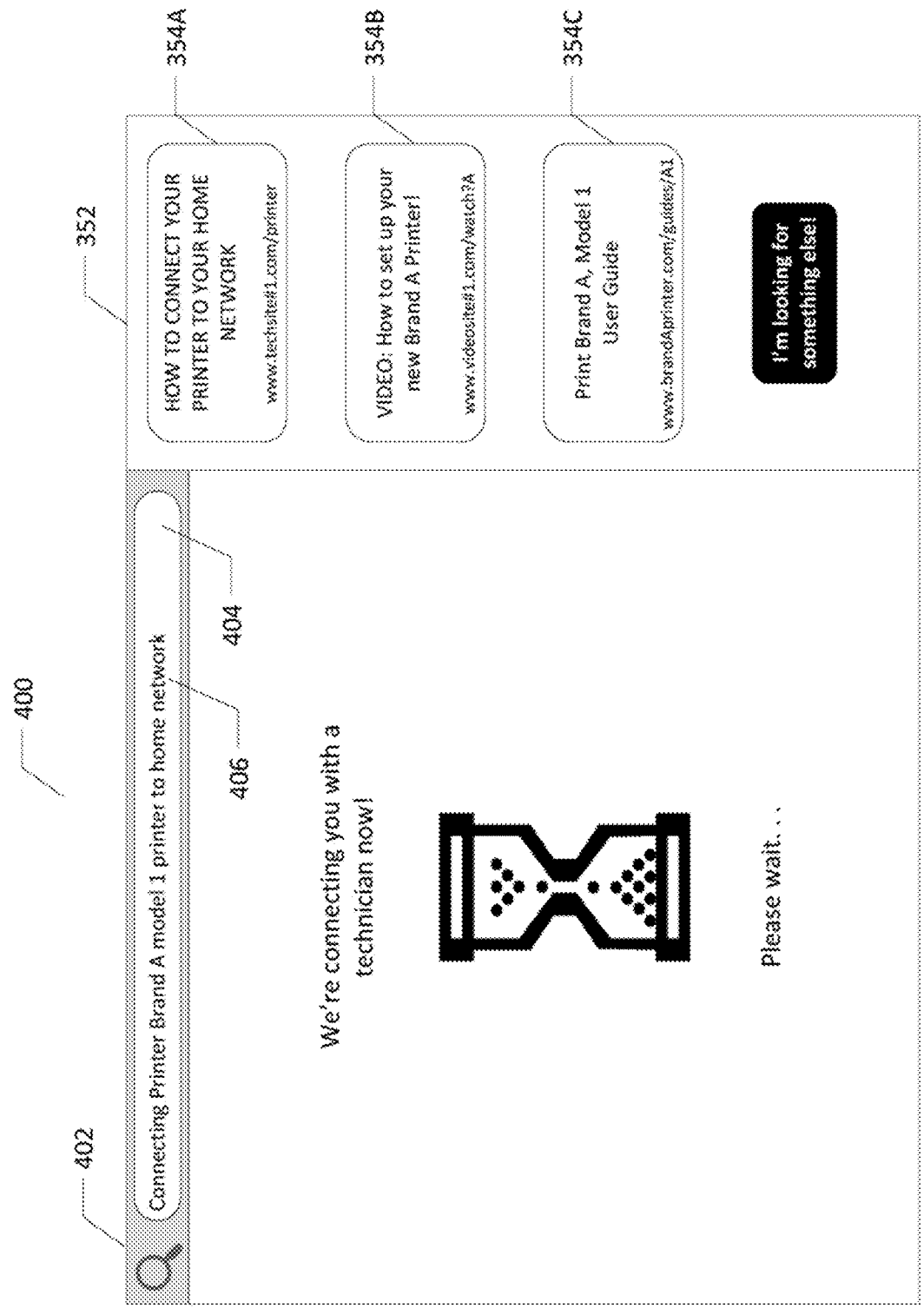
Figure 5A:
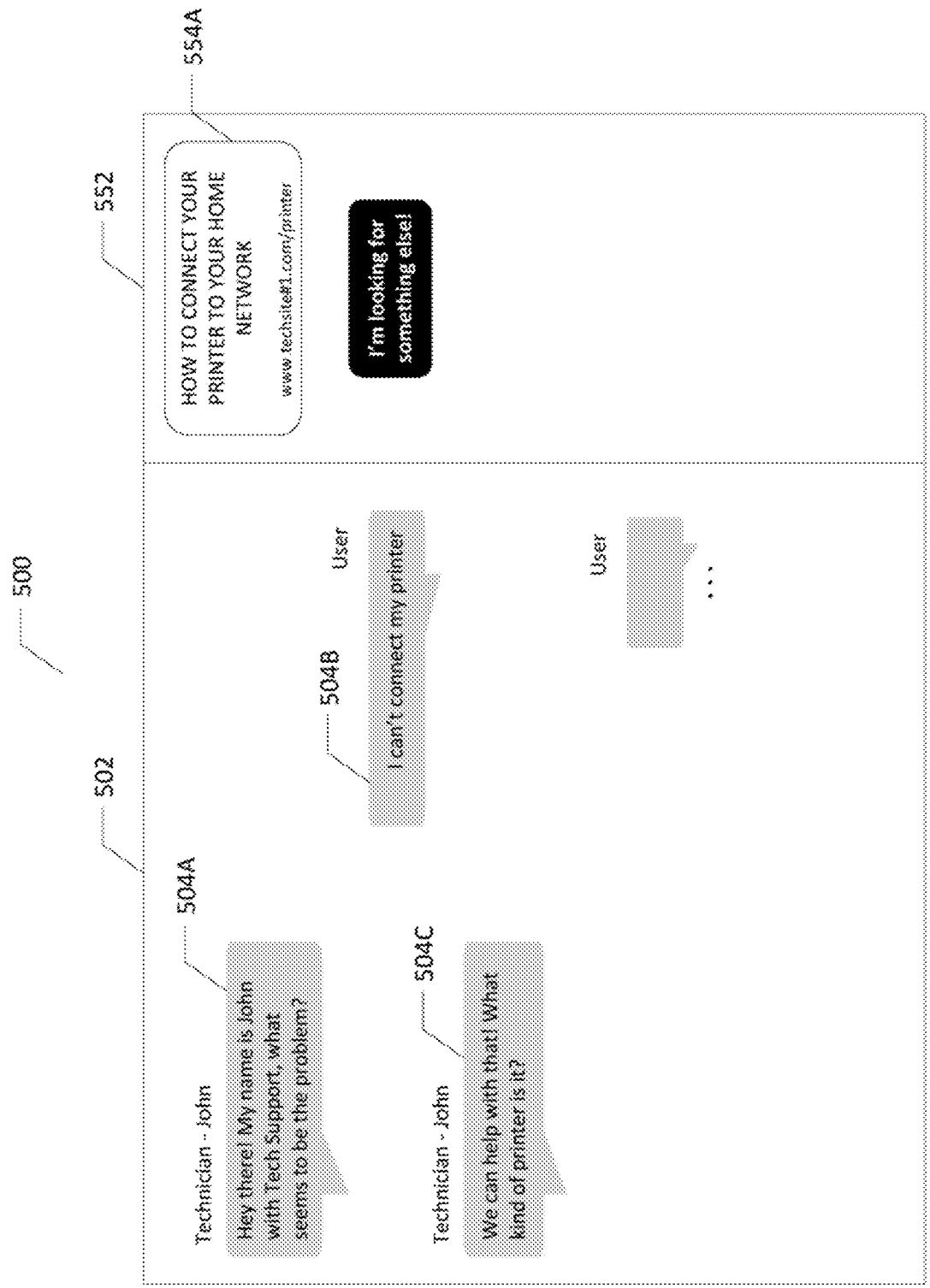
Figure 5B:
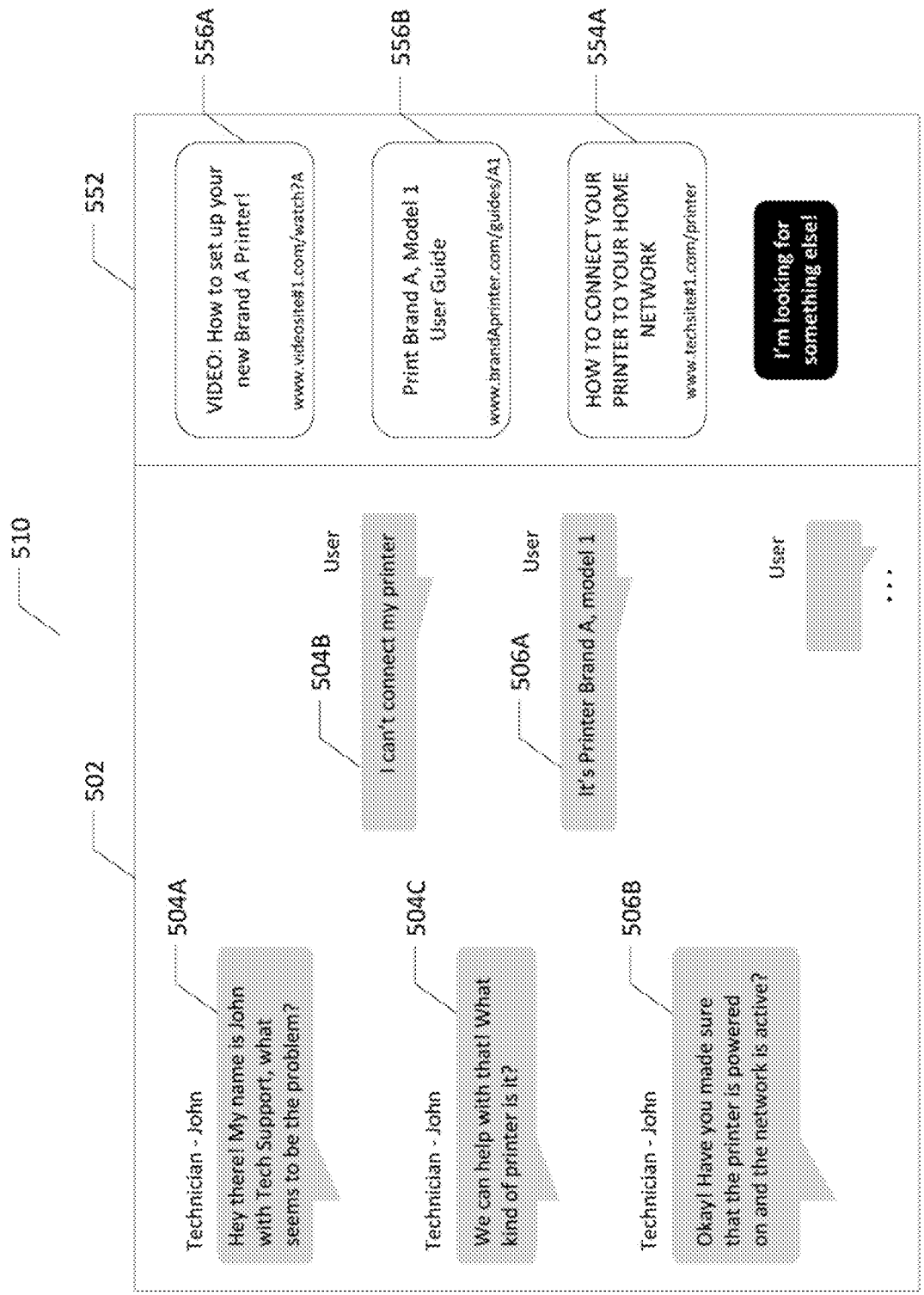
Figure 6:
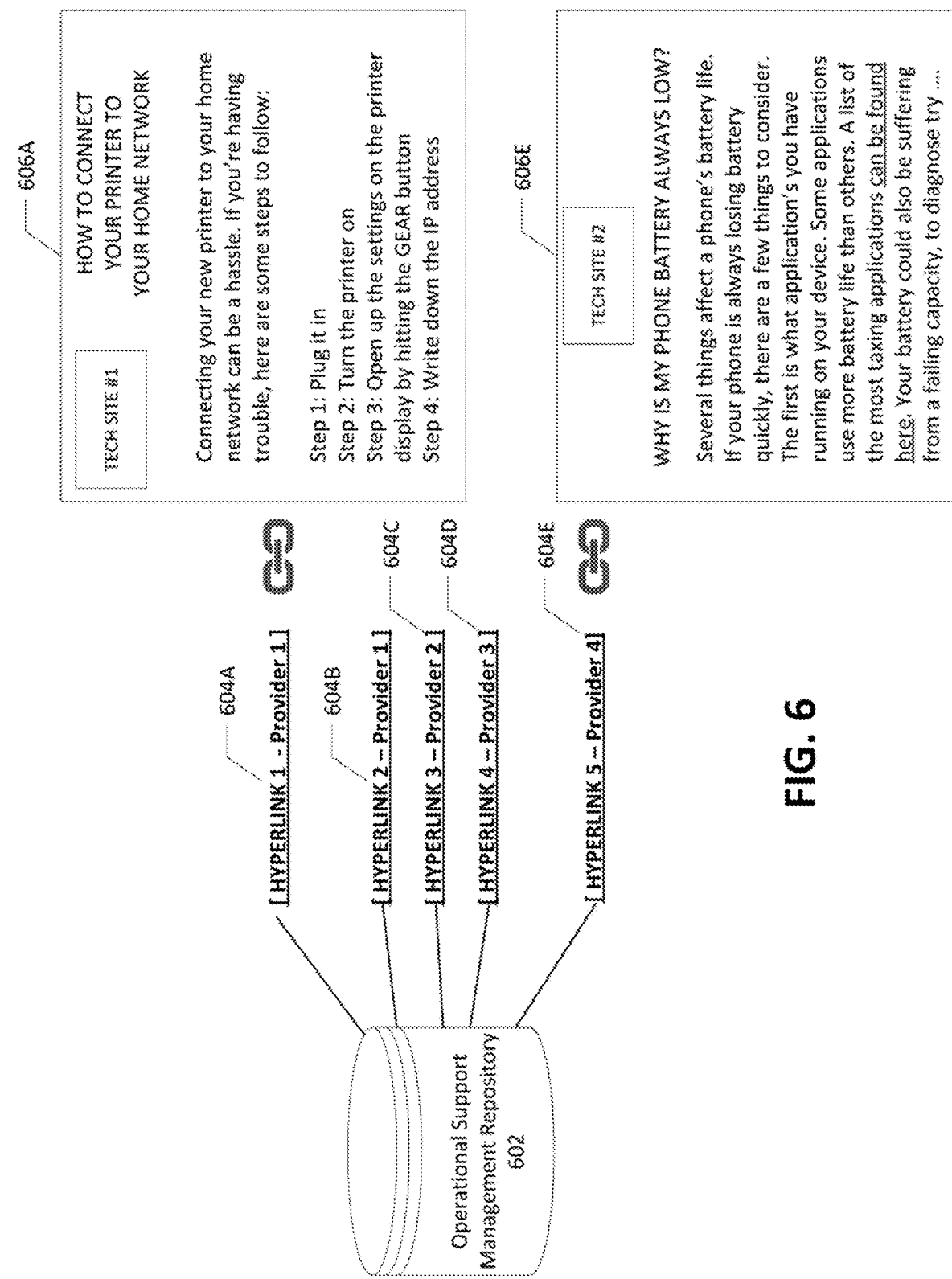
Figure 7:
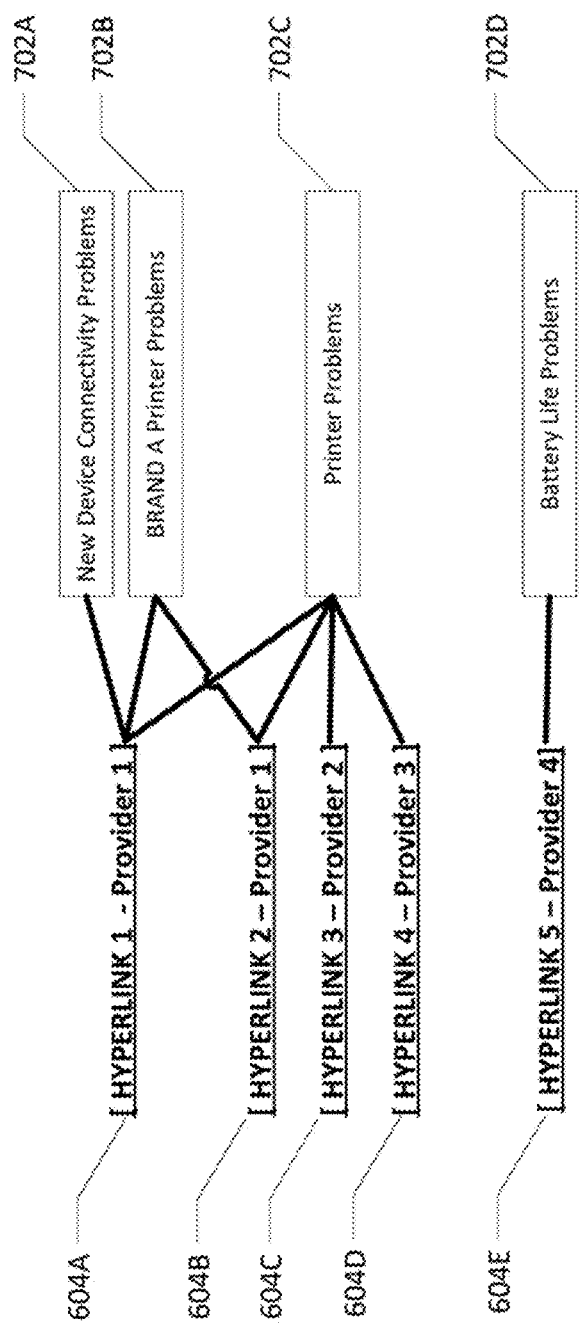
Figure 8:
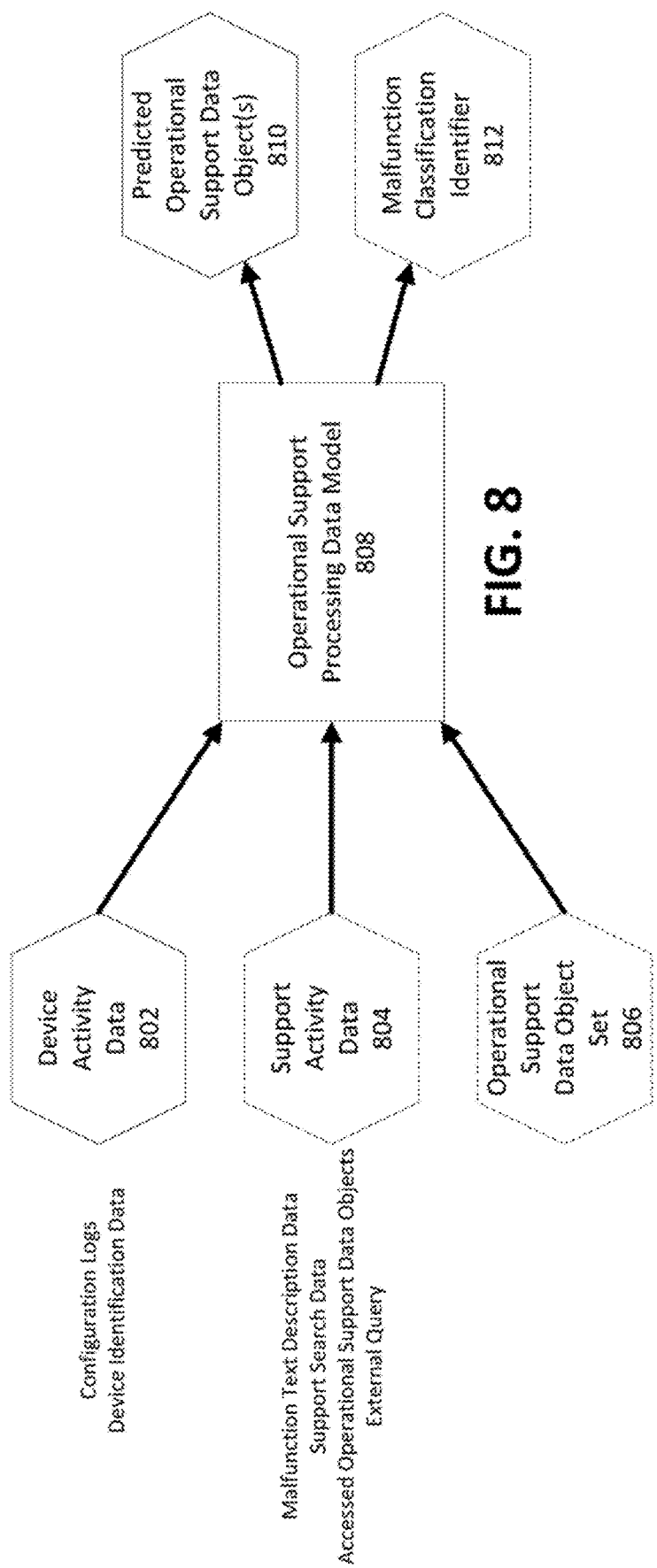
Figure 9:
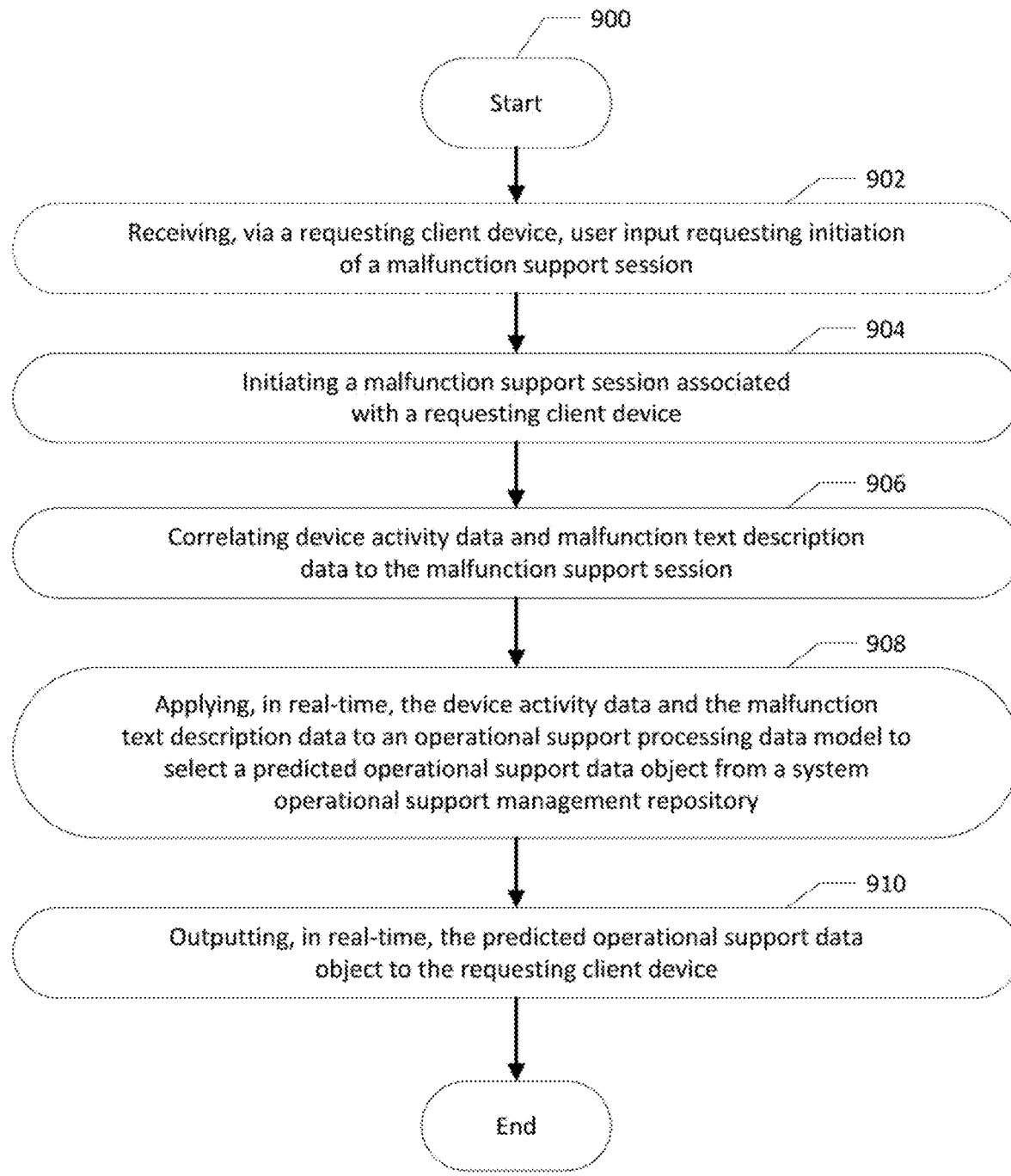
Figure 10:
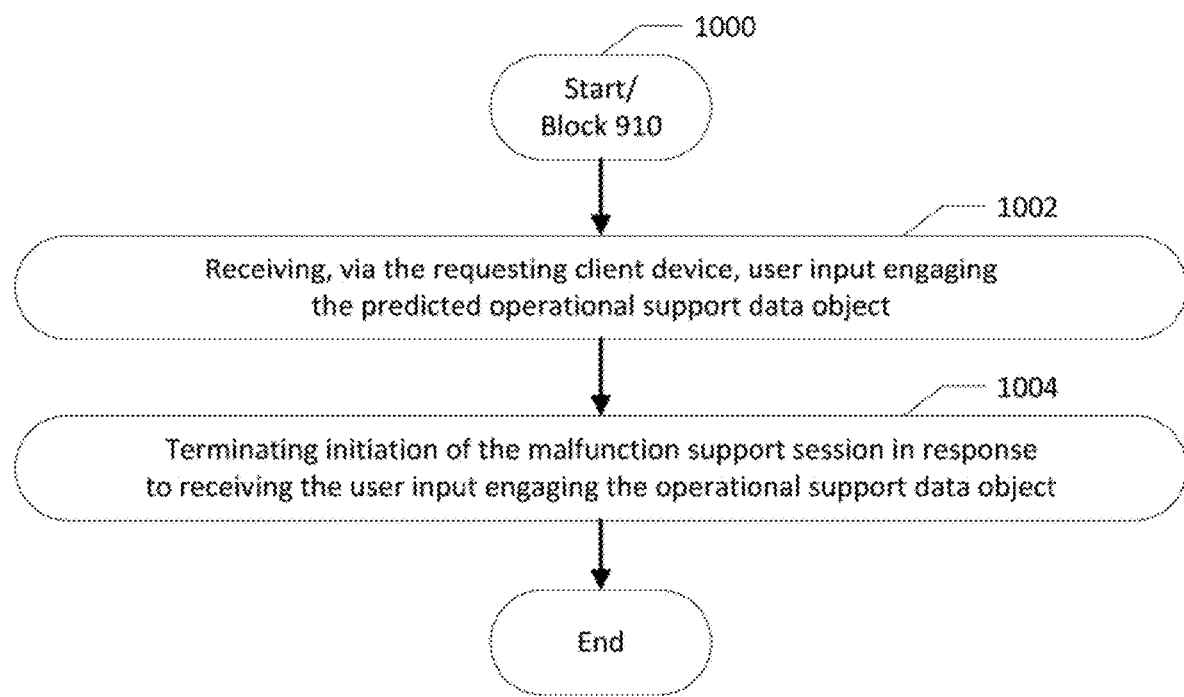
Figure 11:
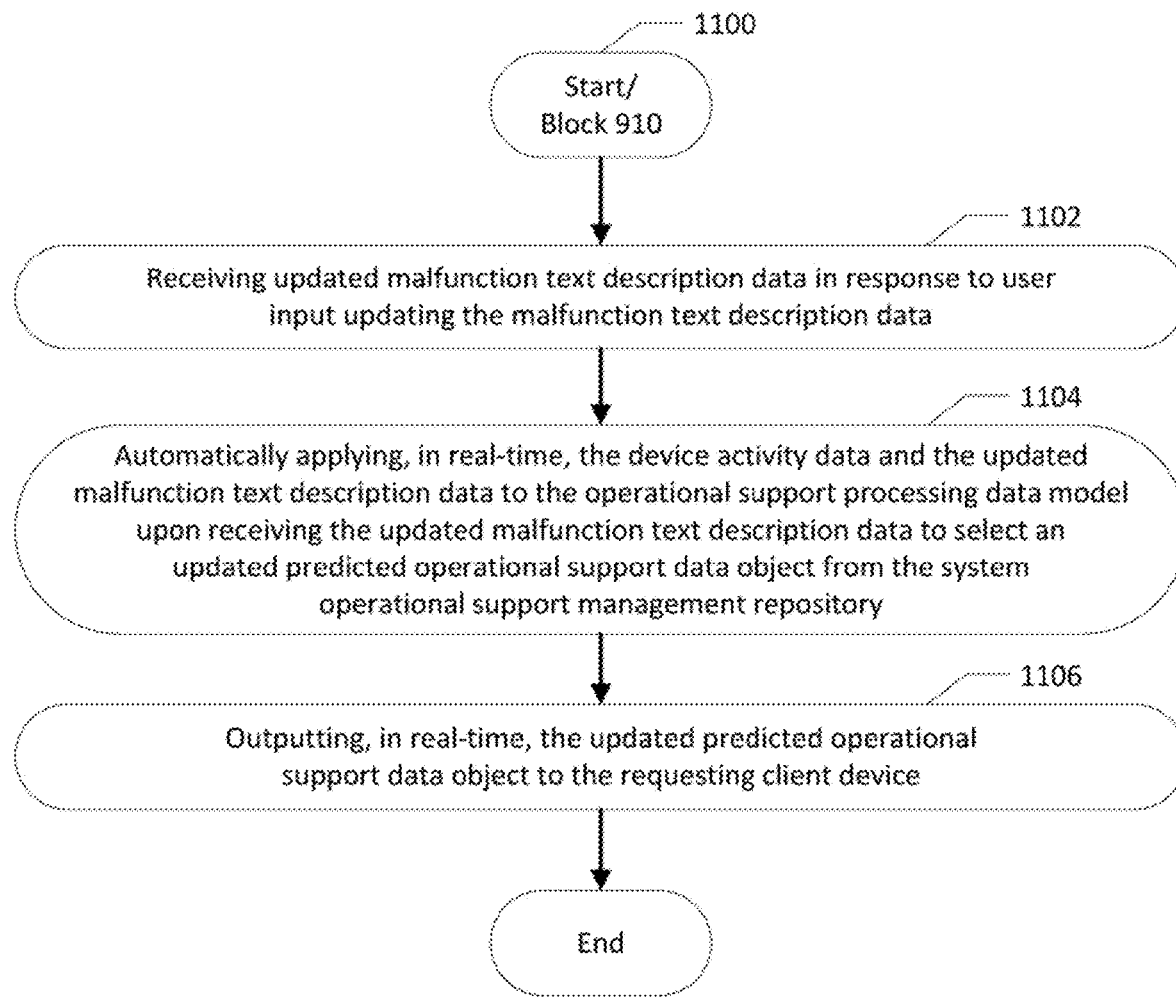
Figure 12:
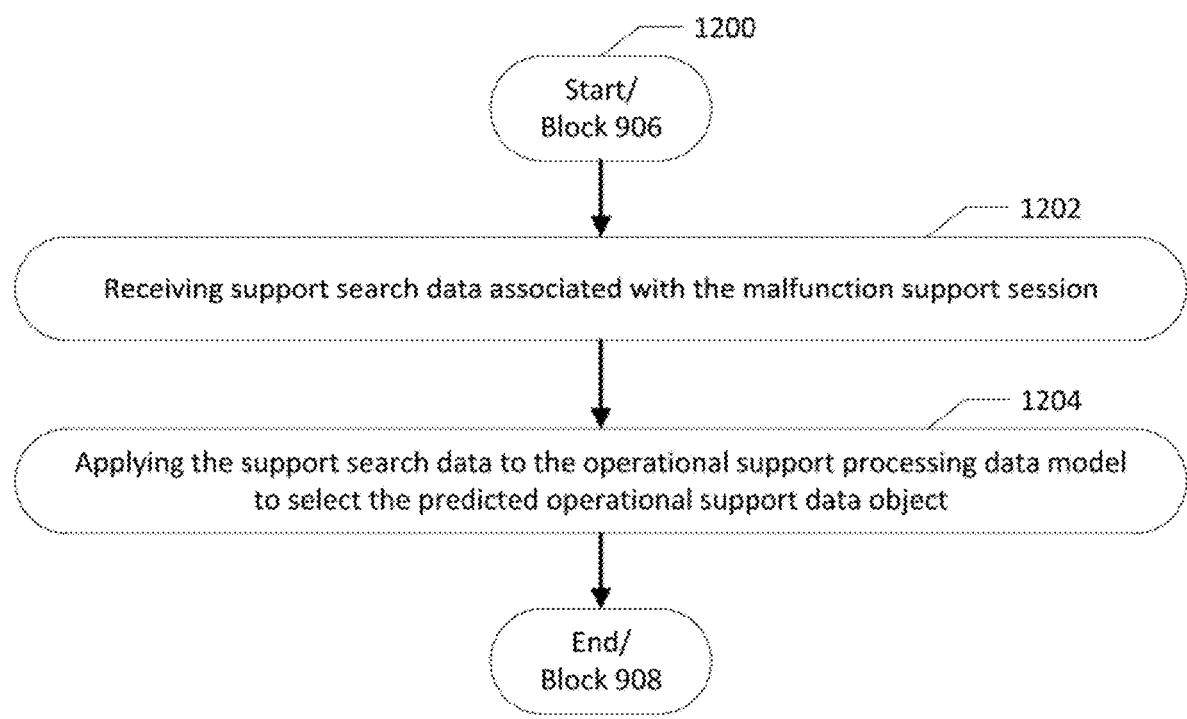
Figure 13:
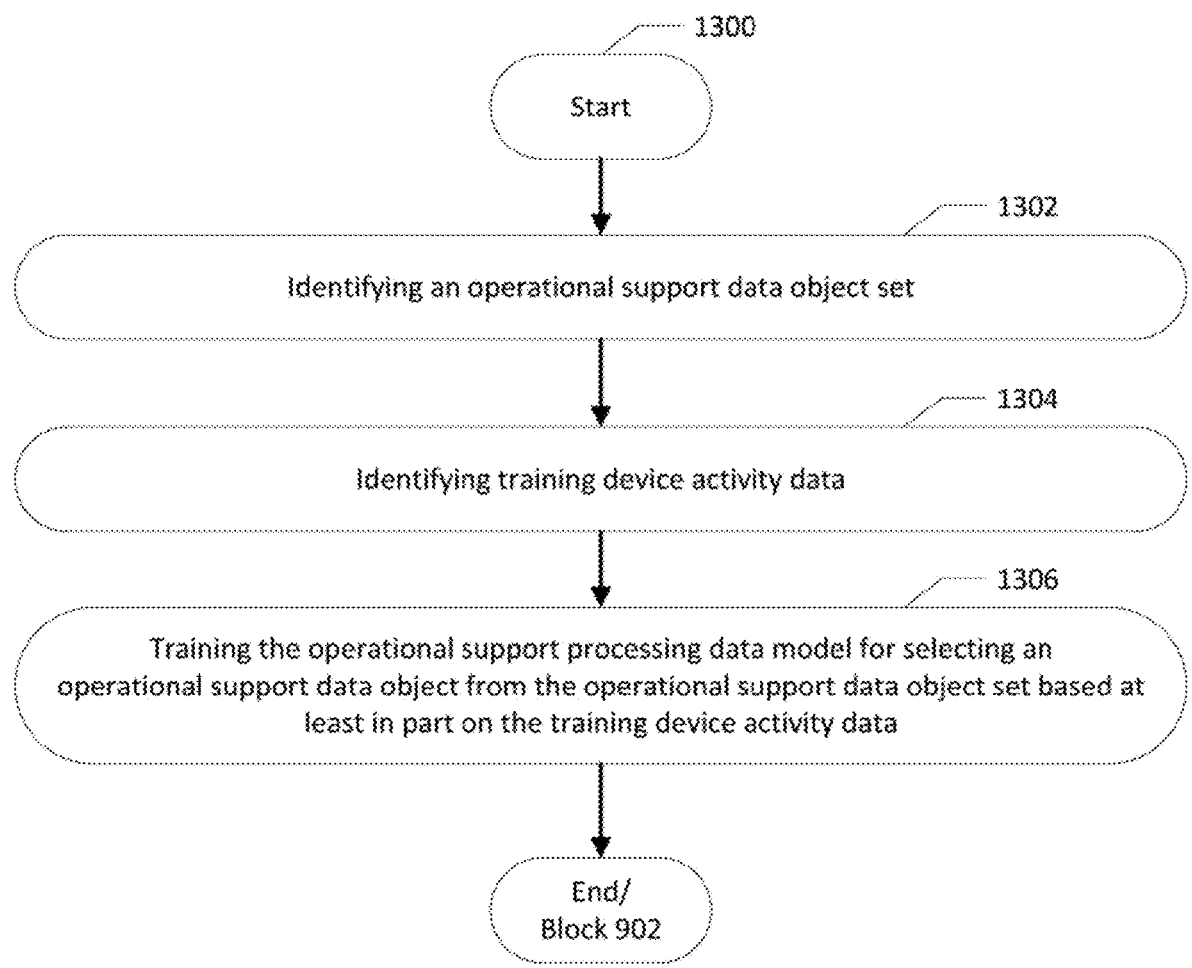

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example malfunction support apparatus that may be specially configured in accordance with an example embodiment of the present disclosure;

FIG. 3 illustrates a visualization of an example support user interface for identifying and outputting at least one predicted operational support data object in accordance with at least some embodiments of the present disclosure;

FIG. 4 illustrates another visualization of an example support user interface for identifying and outputting at least one predicted operational support data object in accordance with at least some embodiments of the present disclosure;

FIG. 5A illustrates a visualization of a dynamically-updated example support user interface for identifying and outputting at least one predicted operational support data object in accordance with at least some embodiments of the present disclosure;

FIG. 5B illustrates a visualization of a dynamically-updated example support user interface for identifying and outputting at least one predicted operational support data object in accordance with at least some embodiments of the present disclosure;

FIG. 6 illustrates an example data representation of operational support data objects storage within an operational support management repository in accordance with at least some embodiments of the present disclosure:

FIG. 7 illustrates an example data representation of operational support data objects associated with malfunction classification identifiers in accordance with at least some embodiments of the present disclosure;

FIG. 8 illustrates an example visualization of predicted operational resource selection utilizing an operational support processing data model in accordance with at least some embodiments of the present disclosure;

FIG. 9 illustrates a flowchart depicting example operations of an example process for applying device activity data and malfunction text description data to an operational support processing data model to select a predicted operational support data object for outputting in accordance with at least some example embodiments of the present disclosure;

FIG. 10 illustrates a flowchart depicting example operations of an example process for terminating initiation of a malfunction support session in accordance with at least some example embodiments of the present disclosure;

FIG. 11 illustrates a flowchart depicting example operations of an example process for dynamically outputting an updated predicted operational support data object in accordance with at least some example embodiments of the present disclosure;

FIG. 12 illustrates a flowchart depicting example operations of an example process for applying support search data in accordance with at least some example embodiments of the present disclosure; and FIG. 13 illustrates a flowchart depicting example operations of an example process for training an operational support processing data model in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

A user may experience any number of malfunctions affecting one or more of the device(s) under their control. For example, a user may have control of any number of device(s) and/or system(s), and any of which may experience a malfunction. The device(s) and/or system(s) may experience operational slowdowns in performance, hardware breakdown, software vulnerabilities (e.g., viruses, spyware, malware, and/or the like), software application crashes, incompatibility with peripherals and/or other devices, connectivity issues with other devices, and/or the like. In the context of a home network, such devices may be connected to the home network, thus increasing the likelihood and types of possible malfunctions. For example, the device(s) and/or system(s) on the network may experience connectivity failures and/or drop-offs with the network, poor connection with the network, incompatibility with the type of network, and/or the like. The network itself may experience any number of malfunctions. For example, the network may experience diminished communication capacities (e.g., decreased bandwidth, throttling, and/or the like), loss of connectivity with an external network (e.g., the Internet), blocked communication channels such as ports, and/or the like.

In this regard, it should be appreciated that a user may at any time be forced to deal with any of a number of malfunctions occurring individually or in parallel. Each malfunction may require different expertise, resources, and/or capabilities to resolve, and the user may not be capable of readily addressing each malfunction as it occurs.

In many contexts, such as a home networks, various types, makes, and models of devices may be interconnected. At any given time, one or more devices that establish the home network may experience a malfunction and such malfunction(s) may trigger others in a daisy chain effect that can produce network wide instability.

A user may not have the knowledge or experience to triage and address all malfunctions associated with their device(s), system(s), and/or network(s). A user may seek assistance from a technical support expert (e.g., a service representative, and/or the like). Such technical support sessions suffer from their own deficiencies. For example, each device, system, and/or network may be associated with different technical representatives, and thus the user may need to identify the appropriate technical representative for a particular malfunction, and/or the appropriate technical representatives for each of a myriad of simultaneous malfunctions. Additionally, connecting with and communicating with a technical representative in an effort to resolve malfunction(s) often is time-consuming and can be complex or unsuccessful for any of a myriad of reasons (e.g., difficulties in communicating with the technical representative, inability for the technical representative to receive sufficient data to diagnose the malfunction(s), lack of knowledge of the technical representative as to how to resolve diagnosed malfunction(s), lack of knowledge of the technical representative as to the structure of the network and its member devices, and/or the like).

Such deficiencies are compounded in magnitude in contexts where a plurality of malfunctions exist simultaneously, and/or a plurality of networked devices are present that may have varying or compounding malfunctions. For example, a user may not be able to self-diagnose and/or resolve a plurality of malfunctions associated with one or more devices, and may have to reach out to a first technical representative for a first malfunction, a second technical representative for a second malfunction, and so on. Each of these malfunctions may or may not be successfully resolved independently, and the likelihood of success is highly dependent on the individual technical capabilities of the user experiencing such malfunctions, the individual technical capabilities of the technical representative to which the user is connected, the communication abilities of each party, and the like. Even in circumstances where all malfunctions are able to be resolved, doing so may require significant time to communicate with each technical representative, diagnose the malfunction, and subsequently resolve each malfunction.

Embodiments of the present disclosure enable the selection and provision of predicted operational support data object(s) accurately determined to be likely to assist in resolving particular malfunction(s) of interest. Such embodiments deliver the predicted operational support data object(s) at a time when they are most apt to be useful to a requesting user—at initiation of a malfunction support session that facilitates communication with a technical support representative.

Embodiments of the present disclosure employ operational support processing data models that are trained using particular data sets, for example, device activity data and at least malfunction text description data, to determine the particular malfunction(s) to be resolved, and/or to select predicted operational support data object(s) that assist in resolving such malfunction(s). In some embodiments, predicted operational support data object(s) may be provided and/or otherwise output via a requesting client device, for example, such that they may be accessed and utilized to resolve the applicable malfunction(s).

Embodiments of the present disclosure reduce the level of technical expertise a user requires to diagnose, triage, and/or resolve particular malfunction(s). By automatically detecting and/or parsing data and applying such data to the trained operational support processing data models described herein, embodiments of the present disclosure can accurately identify malfunctions that are likely to be affecting (or likely to affect in the future) one or more networked device(s) connected to or embodying a dynamic home communications network. Utilizing particular input data corresponding to a particular communications network—such as device activity data, support activity data, and/or historical data—such malfunction(s) and corresponding operational support resource(s) are identified at various levels of granularity with respect to technical malfunction(s) for any varying types of malfunction without requiring additional user expertise to detect, triage, and/or resolve. Additionally or alternatively, in circumstances where multiple
malfunction(s) occur and/or interact with one another (e.g., in a compounding or daisy chain effect), embodiments of the present disclosure may detect such relationships from the detected, stored, and/or input data described herein without relying on user knowledge and/or expertise.

Embodiments of the present disclosure additionally or alternatively reduce and/or eliminate reliance on technical representatives. For example, embodiments of the present disclosure accurately identify data associated with any number of malfunction(s), and predicted operational support data object(s) associated with such malfunction(s) regardless of device type, brand, and/or the like. In this regard, some embodiments of the present disclosure are capable of identifying and outputting predicted operational support data object(s) for resolving malfunction(s) associated with any of such device types, brands, and/or the like. Thus, by enabling identification and outputting of operational support data objects associated with any number of devices of different device types, brands, and/or the like, embodiments of the present disclosure enable better resolving of a myriad of malfunction(s) without requiring laborious and often obfuscated communication with individual technical representatives, identification of such technical representatives, and the like. Further, in circumstances where embodiments provide operational support data object(s) that assist in resolving the technical malfunction(s), such embodiments may entirely eliminate the need to identify and communicate with one or more technical representatives, and avoid any possibility that such technical representatives are ineffective at resolving the malfunction(s) due to lack of expertise, knowledge, or the like.

Some embodiments of the present disclosure may further overcome particular technical constraints arising out of the unique technical context for selecting and outputting predicting operational support data object(s) that may be accessed in lieu of initiating and maintaining a malfunction support session, and/or entirely avoid use of the technical resources necessary to establish and maintain a malfunction support session. For example, in one example context, a user initiates a malfunction support session seeking help with one or more particular malfunctions. To avoid the computing resource cost associated with initiating and/or maintaining such a session, however, predicted operational support data object(s) are to be outputted with low latency requirements. In this regard, predicted operational support data objects likely to assist the user in resolving one or more malfunction(s) are to be outputted with sufficiently low latency such that the user may view and access at least one predicted operational support data object within the few seconds before the malfunction support session is fully connected (e.g., in real-time or near-real-time). Some embodiments of the present disclosure utilize low latency application of particular data models, such as operational support processing data models, that are trained to utilize particular data retrievable and/or detectable in real-time (e.g., device activity data, malfunction text description data, other support activity data, and/or the like). Such data models thus perform in real-time or near real-time, allowing for accurate selection and/or outputting of predicted operational support data objects based on various data regarding the user, the user's devices, the user's communication network, the user's attempted support actions, and/or the like.

It should be appreciated that, by providing an accurate selection and/or output of predicted operational support data object(s), the operational support processing data model provides each and all of the technical improvements described herein. By specially configuring the operational support processing data model, the data model accurately performs such functionality specific to a particular communications network, for example, specific to the networked devices connected thereto and/or embodying the communications network itself.

One example context where embodiments of the present disclosure provide particular advantages is within the context of detecting and/or resolving malfunctions associated with a home network and/or networked devices on a home network.

Embodiments of the present disclosure provide a myriad of technical advantages to various technical fields. For example, embodiments of the present disclosure accurately identify and select predicted operational support data object(s) likely to assist in resolving an identified malfunction. Output of such predicted operational support data object(s) reduces the level of technical capabilities otherwise conventionally required to resolve such malfunction(s). Additionally or alternatively, some embodiments of the present disclosure utilize an operational support processing data model specially configured to perform such predicted operational support data object selection without requiring additional input from any user. Additionally or alternatively still, by providing selected predicted operational support resources that are determined with sufficient accuracy to likely assist in resolving one or more malfunction(s), such embodiments of the present disclosure reduce and/or may eliminate the need to fully initiate a malfunction support session between a client device associated with a user and a technician device associated with a particular technician for resolving such malfunctions. In this regard, embodiments of the present disclosure conserve computing resources of the client device, technician device, and/or intermediary devices that initiate such a connection.

Additionally or alternatively, embodiments of the present disclosure provide operational support data object(s) at a critical time (e.g., when a user has indicated a need for operational support data object(s), has requested technical assistance but not yet received it, or the like). In some contexts, for example, operational support data object(s) are provided during a support session initiation period that occurs after request of initiation of a session but before the session is fully initiated. In this regard, the operational support data objects are accurately determined and provided at a particular time when such operational support data object(s) are most likely to be accessed.

Additionally or alternatively, embodiments of the present disclosure enable accurate identification of self-help content (e.g., embodied in operational support data object(s)) in various contexts. For example embodiments of the present disclosure provide operational support data object(s) for various types of connected networked devices on a particular communications network, daisy chain of errors related to several associated networked devices, and/or otherwise compounded across various communications networks. Additionally or alternatively still, embodiments provide particular operational support data object(s) that are relevant based on current data values (e.g., live devices on a network or recently on a network, user text descriptions, past resolved errors, available content locally and/or hosted by third-parties, and/or the like). Use of such current data may enable accurate identification, selection, and provision of operational support data objects most likely to be engaged by the user and assist in resolving one or more malfunction(s) without requiring connection of an initiated support session.

Additionally or alternatively, embodiments of the present disclosure may eliminate the significant time and/or resource burden associated with user interactions with support session(s). For example, some embodiments provide various technical advantages by providing an accurate list of predicted operational support data objects in real-time or near-real-time upon initiation of a technical support session (e.g., within a few seconds during and/or before initiation of a support session, or process(es) for maintaining the support session), such that the predicted operational support data object(s) may be readily accessed by a user during this critical period. In this regard, the time-related difficulties associated with providing accurate predicted operational support data object(s) are addressed by the embodiments as described herein to enable access to the predicted operational support data object(s) to reduce the likelihood, or completely eliminate, a need for computing resources to be further expended to fully initiate and/or maintain an ongoing support session. Some embodiments describe herein provide further advantages to the field of data content storage and retrieval reliability by maintaining and/or selecting from third-party operational support data object(s) that may be correspond to data maintained and/or made available by individual, disparate, and uncorrelated external data systems.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "user" refers to an entity controlling one or more device(s). Non-limiting examples of a user include a person, an organization, or a group of people in control of a client device having access to a communications network. A user is associated with a "user identifier" and/or "user profile" that uniquely represent the user within a computing environment.

The term "requesting client device" refers to a computing device embodied in hardware, software, firmware, and/or a combination thereof, that enables access to support functionality associated with one or more client device(s), system(s), and/or one or more communications network(s). A client device may execute a browser application configured to access a web-based application providing such support functionality and/or execute a native application that provides the support functionality, and/or which may in turn communicate with the web-based application.

The term "user input" refers to any user interaction with a client device that initiates a process via the client device. Non-limiting examples of user input include a user gesture via a touch zone or interactive display (e.g., a tap, swipe, pinch, multi-touch, multi-tap, and custom gesture), a voice command, a peripheral input, a keyboard press, a mouse click, a video-detected action, and a data input.

The term "communications network" refers to an interconnected one or more computing device(s) embodied in hardware, software, firmware, and/or a combination thereof, that enables transmission of data between such one or more computing devices. Non-limiting examples of a communications network includes a public network (e.g., the Internet), a private network (e.g., a home network, a enterprise network), a cellular network, and a hybrid network.

The term "home communications network" refers to a communications network associated with one or more user identifiers that defines network access within the home environment of the user associated with the user identifier. A home communications network embodies an internal network and/or sub-network (e.g., a sub-network of the Internet) that may include any number of networked devices of varying device types, each of which may be owned and/or operated by a user identifier that controls the home communications network and/or may be owned and/or operated by another user identifier. At any given time, a home communications network includes an "active networked device set" that includes all networked devices currently connected to the home communications network for purposes of communicating, and an "inactive networked device set" that includes all networked devices that are capable of connecting to the home communications network and/or previously have connected to the home communications network but that are not currently connected to the home communications network.

The term "networked device" refers to a computing device connected to or otherwise part of a communications network. Non-limiting examples of a networked device include client device(s) for one or more end user(s) of a communications network, a router, a switch, a relay, a base station, intracontinental and/or transcontinental network wiring, a communications satellite, and a cellular communications tower. The term "networked device set," when used with respect to a particular communications network, refers to one or more networked device(s) of that communications network.

The term "device identification data" refers to data and/or metadata that uniquely identifies a networked device associated with a communications network. Non-limiting examples of device identification data includes a device identifier, an IP address, and an IMEI.

The term "device activity data" refers to electronically managed data representing system-initiated and/or user-initiated action(s) that affect configuration data of networked device(s) associated with a communications network or that indicates an attempt to resolve one or more malfunction classification identifier(s) associated with the networked device(s) associated with the communications network.

The term "support activity data" refers to electronically managed data representing user-initiated action(s) associated with initiating and/or receiving technical support for a malfunction classification identifier. Non-limiting examples of support activity data includes user-inputted search query/queries for operational support data object(s) associated with a malfunction classification identifier, data representing user interaction with a support user interface, chat log data of a malfunction support session between a user utilizing a client device and a technician utilizing a technician device, and user interaction(s) with an automated system for providing technical support data and/or help.

The term "operational support processing data model" refers to a statistical, algorithmic, and/or machine learning model specially trained to identify associations between data indicative of a possible malfunction classification identifier of one or more networked device on a communication network, and any number of third-party operational support data object(s) that may be used to resolve or improve the possible malfunction classification identifier.

The term "predicted operational support data object" refers to electronically managed data and/or instructions identified as likely assist in resolving one or more malfunction(s). In some embodiments, an operational support data object is identified by an operational support processing data model as associated with a confidence score for resolving and/or improving an associated possible malfunction classification identifier where the confidence score is above a particular minimum confidence threshold. Non-limiting examples of a predicted operational support data object includes a data file including text, images, video, and/or the like (e.g., a PDF, DOC, or other format of a mixed-data file), a web page, a uniform resource locator or other web link, computer-executable instructions, a computer application, an image file (e.g., a PNG, JPG, or other image format), and a video file (e.g., a MP4, MOV, AVI, or other video file format). A user may access and/or utilize a predicted operational support data object for performing self-help actions to resolve one or more malfunction(s).

The term "malfunction classification identifier" refers to electronically managed data that uniquely represents a problem in the technical operation of a particular device or system, and/or a problem in the interoperability between devices of a system. Non-limiting examples of a malfunction classification identifier include a problem with connecting a computing device to a communications network, an issue in interoperability between a first computing device and a second computing device, an interoperability problem or failure in connectivity between a computing device and a peripheral, performance hardware component(s) of a computing device below a particular threshold, a drop in performance of hardware component(s) of a computing device over a particular time interval or upon occurrence of a particular event represented in device activity data, crash of a software application, unexpected shutoff of the computing device, loss of network connectivity of the computing device, and existence of malware, spyware, computer virus(es), and the like. In some embodiments, system operational support classification identifiers exist that identify multiple levels of granularity, such that a first system operational support classification identifier includes one or more sub-system operational support classification identifiers. In a non-limiting example context, a system operational support classification identifier embodying a "printer problems" class of technical problems is associated with different sub-identifiers embodying particular problem types (e.g., "printer connectivity problems," "printer printing problems," "printer ink problems," and the like) and/or different sub-identifiers embodying problems for particular instances of devices and/or systems (e.g., "Printer Brand A printing problems," and "Printer Brand B printing problems," and/or "Printer Brand A Model 1 printing problems," and "Printer Brand A Model 2 printing problems").

The term "operational support data object" refers to electronically managed data embodying or that may be utilized to retrieve text content data, webpage data, video data, audio data, data instructions, or software application(s) for improving, solving, and/or troubleshooting one or more malfunction classification identifier(s) associated with one or more computing device(s). "Third-party operational support data object" refers to an operational support data object maintained on a data system separate from a particular data system for providing support functionality associated with the client device(s) and/or communication network(s).

The term "operational support data object set," when used with respect to a particular malfunction classification identifier, refers to any number of third-party operational support data objects that may be utilized to improve or otherwise resolve the malfunction classification identifier.

The terms "operational support management repository" and "system operational support management repository" refer to one or more electronically maintained databases embodied in hardware, software, firmware, and/or a combination thereof, that stores any number of operational support data objects and/or associations between operational support data object(s) and operational support classification identifier. In one non-limiting example context, an operational support management repository includes operational support data objects, each stored together with operational support classification identifiers embodying malfunction classification identifiers the operational support data object is determined to resolve.

The term "malfunction support session" refers to an authorized connection between a client device and a technician device that enables the provision of technical support a technician via the technician device to a user of the client device. A malfunction support session enables data transfer between the client device and the technician device, which may include text data, video data, access control to the client device, and/or configuration of one or more networked device(s) communicable via the client device.

The term "malfunction text description data" refers to text data transmitted as part of a malfunction support session by a client device and/or technician device associated with the malfunction support session. Malfunction text description data includes user-inputted text data includes freeform text data and/or text data selected from a predetermined set of available text element(s).

The term "support session initiation period" refers to a period of time defined by the malfunction support system after receipt of a user request to initiate a malfunction support session but before the malfunction support session is actually established with the requesting client device. In some embodiments, a support session initiation period is configured as an intermediary period during which predicted operational support data objects are displayed to a user prior to or in parallel with the malfunction support system operating to establish the malfunction support session. In one example context, a support session initiation period refers to a period of time after a user requests initiation of a malfunction support session but before selection of a particular technician device with which to establish a connection and/or before the connection with the particular technician device is established. In some embodiments, the end of a support session initiation period is represented by a time where a malfunction support session is established with a particular technician device or technician.

The term "support search data" refers to electronically managed data inputted via a client device that is associated with a user search for technical support associated with one or more malfunction classification identifier(s). In some embodiments, the support search data includes user-inputted text data that represents a user's description of the malfunction classification identifier. Support search data is one example type of malfunction text description data.

The term "support user interface" refers to a user interface that includes one or more interface elements associated with providing access to a malfunction support session. In some embodiments, a support user interface includes a plurality of sub-interfaces that each provide access to different data and/or functionality associated with providing technical support functionality.

The term "main support transmission process" refers to computer-driven process for initiating, maintaining, and engaging with a malfunction support session. A main support process is performed separate from one or more secondary support process(es) that operate in parallel with the main support process. Non-limiting examples of a secondary support process includes a process that provides operational support data object(s) to associated with one or more identified malfunction classification identifier(s) dynamically as a user engages with a main support transmission process.

The term "training device activity data" refers to electronically managed data representing all or a portion of available device activity data to be utilized to train a particular operational support processing data model. During training, the training set of device activity is processed by the operational support processing data model to enable the operational support processing data model to identify data trends, patterns, and/or other linkages in the training set of device activity data.

Example Systems and Apparatuses of the Disclosure

FIG. 1 illustrates a block diagram of a system that may be specially configured within which embodiments of the present disclosure may operate. Specifically, FIG. 1 depicts an example system 100 configured to enable selection and provision of predicted operational support data object(s). The system 100 includes a malfunction support system 102, external data system(s) 112, a client device 104, any number of networked devices, including a printer 106A, a smartphone 106B, a tablet 106C, and one or more other networked device(s) 106D (the networked devices 106A-106D collectively "networked devices 106"). The networked devices 106 are communicable with one another and/or one or more other device(s), such as the client device 104, over a first communications network 110. The malfunction support system 102 is communicable with one or more other device(s), such as the external data system(s) 112 and/or the client device 104, over a second communications network 108.

The malfunction support system 102 includes one or more computing device(s) embodied in hardware, software, firmware, and/or a combination thereof, that provides predicted operational support data object selection and provision functionality. For example, the malfunction support system 102 may embody or otherwise be included in a system that provides a user automatic and/or technician-based support associated with one or more networked device(s). The malfunction support system 102 trains an operational support processing data model, maintains a trained operational support processing data model, utilizes the operational support processing data model to select one or more predicted operational support data object(s), and/or output predicted operational support data object(s). The malfunction support system 102 may provide such functionality to a client device, such as the client device 104, associated with any number of computing device(s), such as one or more of the networked device(s) 106. In some embodiments, the malfunction support system 102 maintains one or more repositories that store operational support data object(s), data links for accessing operational support data object(s) (including third-party operational support data object(s)), associations between operational support data object(s) and malfunction classification identifier(s), and/or correlations between device activity data, support activity data (including malfunction text description data for example), and malfunction classification identifier(s).

The external data systems 112 may include any number of data systems external to the malfunction support system 102. Each external data system of the external data systems 112 may include one or more computing device(s) embodied in hardware, software, firmware, and/or a combination thereof, that hosts, stores, and/or otherwise provides access to one or more operational support resource(s). For example, in some embodiments, the external data systems 112 includes one or more third-party web server(s) that hosts content associated with particular malfunction(s). Such content may include web page(s), video(s), image(s), article(s), manual(s), and/or other text content, application(s) that diagnose and/or attempt to resolve certain malfunction(s), and/or the like. It should be appreciated that each external data system may be controlled by a different entity, and/or that each external data system may maintain operational support data object(s) associated with particular malfunction(s). For example, each external data system controlled by a particular entity embodying a device manufacturer may maintain operational support data object(s) associated with the device(s) and/or system(s) offered by the device manufacturer. Alternatively or additionally, for example, an external data system embodying a technical support forum platform may include operational support data object(s) associated with various malfunction(s) for various types, makes, models, and other variations of device(s).

Alternatively or additionally, in some embodiments the external data systems 112 include any number of data systems that stores data that is received, scraped, and/or otherwise identified by the malfunction support system 102. The data identified from such external data systems 112 may be used to identify malfunction classification identifier(s) likely affecting one or more networked device(s), and/or used to identify predicted operational support data object(s) most likely to assist in resolving malfunction(s) associated with one or more malfunction classification identifier(s). For example, the external data systems 112 may include social media systems, web-hosted blog systems, news systems, and/or the like, that create and/or make available digital content associated with particular malfunction(s). In this regard, the malfunction support system 102 may receive and process such data to generate and/or identify malfunction classification identifier(s) associated with particular networked device(s) that are indicated as common, affecting multiple device(s) associated with various individuals, particularly severe or of high importance, and/or the like. For example, the malfunction support system 102 may identify social media data, news article data, and the like, from various systems of the external data systems 112, where all such data indicates a particular malfunction that has recently been affecting many or all devices of a particular device type. In this regard, the malfunction support system 102 may utilize such data to adjust the likelihood that predicted operational support data object(s) associated with the particular malfunction (e.g., linked to a malfunction classification identifier corresponding to the particular malfunction) are more likely to be provided where relevant to a particular user profile. For example, the malfunction support system 102 may increase the likelihood that such predicted operational support data object(s) are provided in a circumstance where device activity data associated with a user profile indicates ownership of a device of the particular device type, and/or in a circumstance where device activity data and/or support activity data indicates existence of a malfunction associated with a device of the particular device type. In some embodiments, the malfunction support system 102 utilizes such data to train one or more model(s) as described herein, for example to increase the likelihood that such model(s) select predicted operational support data objects associated with malfunction support classification identifiers that represent particular malfunction(s) that are "trending" or otherwise indicated as affecting a large number of users (e.g., based on identifying a number of posts, articles, or other data that discuss a certain malfunction is above a certain threshold).

The client device 104 may include any number of computing device(s) embodied in hardware, software, firmware, and/or a combination thereof that provides a user access to functionality of the malfunction support system 102, and/or one or more of the networked devices 106. In some embodiments, the client device 104 is embodied by a user device owned, operated, and/or otherwise controlled by a particular user. Non-limiting examples of a client device 104 include a specially configured smartphone, personal computer, tablet, laptop, smart watch, smart television, wearable, virtual reality device, virtual assistant device, and/or the like. The client device 104 may be specially configured to provide access to such functionality via one or more software application(s) (e.g., "apps") installed to and/or otherwise executable via the client device 104. In some embodiments, the client device 104 includes or is communicable with one or more connected devices that provides processing, communication, networking, display, and/or other functionality. For example, the client device 104 may include a smart watch paired with a smartphone, where the smart watch displays information processed and/or retrieved via the smartphone and transmitted from the smartphone to the smart watch over a short-range communications network (e.g., a Bluetooth connection).

In some embodiments, the client device 104 is associated with a particular user profile. The user profile may be utilized to associate particular data collected and/or otherwise to be processed via the malfunction support system 102 with the client device 104. The user profile may be automatically created and/or assigned (e.g., based on a device identifier corresponding to the client device 104), or may be generated in response to particular action by a user associated with the client device (e.g., upon registration of a user profile via the malfunction support system 102). In some embodiments, a user profile is used to associate particular device identification data for networked devices owned and/or controlled by a particular user of the client device 104, identify particular communications networks (e.g., dynamic home communications networks) controlled by the user and/or networked devices thereof, initiate particular functionality of the malfunction support system 102, and/or the like. It should be appreciated that in circumstances where particular data is linked to a user profile, such data may subsequently be utilized to limit and/or weight particular data relevant to the user profile. For example, device identification data indicating existence of particular networked devices active and/or inactive for a particular dynamic home communications network may be stored by the malfunction support system 102 associated with a particular user profile corresponding to the client device 104. Subsequently, upon initiation of particular functionality as described herein (e.g., initiating a malfunction support session), the malfunction support system 102 may retrieve and utilize such data to apply it to a particular data model that generates higher weights for operational support data object(s) relevant to the networked device(s) identified by such data stored associated with the user profile.

The communications network 108 includes any number of computing device(s) embodied in hardware, software, firmware, and/or a combination thereof, that enables transmission of data to and/or from one or more other device(s) connected thereto. For example, as depicted, the communications network 108 may enable transmission of data between the malfunction support system 102 and/or the external data systems 112. Additionally or alternatively, the communications network 108 may enable transmission of data between the client device 104 and the malfunction support system 102. Additionally or alternatively still, in some embodiments, the communications network 108 enables transmission of data between the client device 104 and some or all of the external data systems 112.

The communications network 108 may embody any of a myriad of network configurations. In some embodiments, the communications network 108 embodies a public network (e.g., the Internet). In some embodiments, the communications network 108 embodies a private network (e.g., an internal network between particular devices). In some other embodiments, the communications network 108 embodies a hybrid network (e.g., a network enabling internal communications between particular connected devices and external communications with other devices). The communications network 108 may include one or more base station(s), relay(s), router(s), switch(es), cell tower(s), communications cable(s) and/or associated routing station(s), and/or the like. In some embodiments, the communications network 108 includes one or more user controlled computing device(s) (e.g., a user owner router and/or modem) and/or one or more external utility devices (e.g., Internet service provider device(s)).

The communications network 110 may embody a private network enabling communication between the various networked devices 106 and the client device 104. In some embodiments, for example, the communications network 110 embodies a home network that enables communication between various devices on the home network, such as a network connected printer (networked device 106A), a user's smartphone (networked device 106B), a user's tablet (networked device 106C), other networked devices 106D such as other user's smartphones, personal computers, laptops, smart televisions and/or other Internet-of-things enabled devices, virtual assistant devices, home security systems, and/or the like. The user may utilize one or more such devices independently, and/or access it through another device connected to the communications network 110, for example through interaction with the client device 104.

Device activity data may be detected and/or otherwise received by the malfunction support system 102 associated with the communications network 110, client device 104, and/or any one or more of the networked devices 106. For example, in some embodiments, the device activity data associated with each networked device connected to the communications network 110, and/or associated with components of the communications network 110 itself, is detected, requested, and/or otherwise received by the client device 104 for transmitting to the malfunction support system 102. Alternatively or additionally, in some embodiments, the malfunction support system 102 monitors the communications network 110 directly to identify the device activity data associated with the communications network 110 and/or networked devices 106 communicable therewith. The user may utilize the client device 104 to update configurations and/or otherwise affect operation of one or more of the networked devices 106, and device activity data indicating such configuration updates (e.g., configuration logs) may be included in the device activity data processed via the system 100.

Additionally or alternatively, in some embodiments, support activity data is generated based on one or more initiated actions associated with diagnosing and/or resolving one or more malfunction(s). In some embodiments, for example, support activity data may be generated and/or received by the malfunction support system 102 from the client device 104 that represents initiated search queries (e.g., performed via a search engine) for support regarding a malfunction, interactions with one or more support process(es) of the malfunction support system 102 and/or an associated system (e.g., malfunction text description data inputted via the client device 104 during a malfunction support session), and/or the like. The support activity data and/or device activity data may be generated by any of the devices as depicted and described herein, and received and/or otherwise stored by the malfunction support system 102 for processing to select one or more predicted operational support data object(s) as described herein.

At any given time, one or more of the networked devices 106 may experience a malfunction, and/or the communications network 110 itself may experience a malfunction. For example, one or more of the networked devices 106 may operate at a diminished capacity due to any of a myriad of physical and/or virtual factors, such as (1) incompatibility of hardware, software, firmware, and/or the like, (2) diminished hardware components, and (3) operation of malicious software such as spyware, malware, viruses, and/or the like. Alternatively or additionally, one or more of the networked devices 106 may experience an error in network connectivity. For example, the networked device 106A may lose connection with the communications network 110 due to any of a myriad of malfunctions, such as loss of signal by the networked device 106A, a faulty hardware component for connecting the networked device 106A to the communications network 110, a change in configuration that prevents the networked device 106A from reconnecting to the communications network 110, and/or the like. Additionally or alternatively, in some embodiments the communications network 110 itself may experience one or more malfunctions, for example loss of power by one or more devices embodying the communications network 110, loss in connection to an outside network by the communications network (e.g., an Internet outage), reconfiguration of one or more devices of the communications network 110 that prevents communication of traffic to and/or from one or more of the networked devices 106A, and/or the like.

Additionally or alternatively, each of the networked devices 106 may experience different types of malfunction. For example, a smart printer (e.g., embodied by networked device 106A) may experience particular operational problems that are different from those experienced by a smartphone (e.g., embodied by networked device 106B). In this regard, as the number of different types of networked devices on a particular communications network grows, the complexity of possible malfunctions that may arise and/or need to be resolved increases.

Accordingly, it should be appreciated that as the complexity of networked devices increases (e.g., the number increases and/or the variability of devices having different characteristics increases). Such technical complexities are especially prevalent in the context of home networks. For example, in the context of a home network embodied by communications network 110, the networked devices 106 may include any number of networked devices, each of varying device types, makes, models, operations, and/or the like. Additionally or alternatively, one or more of such devices may be actively in communication via the network, and other networked devices may be inactive and/or otherwise not in communication via the network. The client device 104 enables interaction, as described herein, with the malfunction support system to utilize system operational support data model(s) to accurately identify and/or output predicted operational support data object(s) for assisting in resolving any one or more of various malfunction(s).

Additionally or alternatively, the communications network 110 may embody a dynamic home communications network that is associated with a regularly changing list of actively connected networked devices ("active networked devices") and inactive networked devices not connected to the communications network 110. For example, a user handheld device may regularly disconnect with the communications network 110 as the user handheld device is relocated (e.g., for reaching out of range of the communications network 110) and/or may dynamically reconnect (e.g., upon reentering a range of the communications network 110). In this regard, device activity data may be identified, retrieved, and/or otherwise received that indicates the active networked devices at a particular point in time, and/or the inactive networked devices at any particular point in time. In some embodiments, such data may be utilized to identify particular networked devices of the communications network 110. For example, the inactive networked devices and active networked devices may be compared over one or more time intervals to determine fixed components of the communications network 110, such as a router, modem, and/or the like, which may be configurable to address malfunctions associated with network connectivity of one or more networked devices and/or the communication network 110 itself.

FIG. 2 illustrates a block diagram of an example malfunction support apparatus that may be specially configured in accordance with an example embodiment of the present disclosure. In some embodiments, the malfunction support system 102 is embodied by one or more computing systems, such as the malfunction support apparatus 200 as depicted and described in FIG. 2. The malfunction support apparatus 200 includes processor 202, memory 204, input/output circuitry 206, communications circuitry 208, and support provision circuitry 210. The malfunction support apparatus 200 may be configured, using one or more of the sets of circuitry 202, 204, 206, 208, and/or 210, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the malfunction support apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or coprocessor or any other processing circuitry assisting or otherwise associated with the processor) may be in communication with the memory 204 via a bus for passing information among components of the malfunction support apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the malfunction support apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the malfunction support apparatus 200, and/or one or more remote or "cloud" processor(s) external to the malfunction support apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied in the specific operations described herein when such instructions are executed.

As one particular example, the processor 202 may be configured to perform various operations associated with improved predicted operational support data object selection and provision, for example as described with respect to operation of the malfunction support system 102 and/or as described further herein. In some embodiments, the processor 202 includes hardware, software, firmware, and/or a combination thereof, that receives and/or retrieves device activity data associated with a particular client device, user profile, and/or the like. Additionally or alternatively, in some embodiments, the processor 202 includes hardware, software, firmware, and/or a combination thereof, that receives and/or retrieves support activity data associated with a particular client device, user profile, and/or the like. Additionally or alternatively, in some embodiments, the processor 202 includes hardware, software, firmware, and/or a combination thereof, that maintains one or more data repositories of operational support data object(s) and/or associations thereof. Additionally or alternatively, in some embodiments, the processor 202 includes hardware, software, firmware, and/or a combination thereof, that maintains an operational support processing data model. Additionally or alternatively, in some embodiments, the processor 202 includes hardware, software, firmware, and/or a combination thereof, that initiates and/or maintains a malfunction support session. Additionally or alternatively, in some embodiments, the processor 202 includes hardware, software, firmware, and/or a combination thereof, that correlates device activity data and malfunction text description data with a particular malfunction support session. Additionally or alternatively, in some embodiments, the processor 202 includes hardware, software, firmware, and/or a combination thereof, that applies input data such as device activity data and malfunction text description data to an operational support processing data model in real-time. Additionally or alternatively, in some embodiments, the processor 202 includes hardware, software, firmware, and/or a combination thereof, that outputs, in real-time, a predicted operational support data object selected by an operational support processing data model.

In some embodiments, the malfunction support apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application user interface, a user device, a backend system, or the like. In some embodiments, the input/output circuitry 206 may also include a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 may be any means such as a device or circuitry embodied in either hardware or a combination of hardware and software that is configured to receive and/or transmit data from/to a network and/or any other device, circuitry, or module in communication with the malfunction support apparatus 200. In this regard, the communications circuitry 308 may include, for example, a network interface for enabling communications with a wired or wireless communication network. For example, the communications circuitry 208 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 208 may include circuitry for interacting with the antenna(s)

and/or other hardware or software to cause transmission of signals via the antenna(s) or to handle receipt of signals received via the antenna(s). In some embodiments, the communications circuitry 208 enables transmission to and/or receipt of data from a client device in communication with the malfunction support apparatus 200.

The support provision circuitry 210 includes hardware, software, firmware, and/or a combination thereof, that supports various functionality associated with improved selection and/or provision of predicted operational support data object(s). For example, in some embodiments, the support provision circuitry 210 includes hardware, software, firmware, and/or a combination thereof, for receiving one or more input data sets for processing via an operational support processing data model. Additionally or alternatively, in some embodiments, the support provision circuitry 210 includes hardware, software, firmware, and/or a combination thereof, for initiating initiates and/or maintains a malfunction support session. Additionally or alternatively, in some embodiments, the support provision circuitry 210 includes hardware, software, firmware, and/or a combination thereof, for correlating device activity data and malfunction text description data with a particular malfunction support session. Additionally or alternatively, in some embodiments, the support provision circuitry 210 includes hardware, software, firmware, and/or a combination thereof, for applying the device activity data and malfunction text description data to an operational support processing data model in real-time. Additionally or alternatively, in some embodiments, the support provision circuitry 210 includes hardware, software, firmware, and/or a combination thereof, for outputting, in real-time, a predicted operational support data object selected by an operational support processing data model.

Additionally or alternatively still, in some embodiments, the support provision circuitry 210 includes hardware, software, firmware, and/or a combination thereof, for receiving user input indicting engagement with a predicted operational support data object. Additionally or alternatively, in some embodiments, the support provision circuitry 210 includes hardware, software, firmware, and/or a combination thereof, for terminating initiation of the malfunction support session. Additionally or alternatively, in some embodiments, the support provision circuitry 210 includes hardware, software, firmware, and/or a combination thereof, for receiving and processing updated device activity data and/or support activity data. Additionally or alternatively, in some embodiments, the support provision circuitry 210 includes hardware, software, firmware, and/or a combination thereof, for training an operational support processing data model.

It should be appreciated that, in some embodiments, support provision circuitry 210 may include a separate processor, specially configured field programmable gate array (FPGA), or a specially programmed application specific integrated circuit (ASIC). Additionally or alternatively, in some embodiments, one or more of the sets of circuitries 202-210 are combinable. Alternatively or additionally, in some embodiments, one or more of the sets of circuitry perform some or all of the functionality described associated with another component. For example, in some embodiments, one or more of the sets of circuitry 202-210 are combined into a single module embodied in hardware, software, firmware, and/or a combination thereof. Similarly, in some embodiments, one or more of the sets of circuitry, for example support provision circuitry 210 is combined such that the processor 202 performs one or more of the operations described above with respect to each of these modules.

Example Interfaces of the Disclosure

Having described example systems and apparatuses in accordance with the present disclosure, example interfaces in accordance with the present disclosure will now be discussed. Each user interface may be renderable via any of a myriad of display(s). For example, in some embodiments a user interface is renderable via a client device 104 and/or a malfunction support apparatus 200. In some embodiments, the malfunction support apparatus 200 configures and/or otherwise causes rendering of the particular user interface(s) depicted. For example, in some embodiments, the malfunction support apparatus 200 outputs data for rendering via a display of the malfunction support apparatus 200. Alternatively or additionally, in some embodiments, the malfunction support apparatus 200 outputs data to a client device for rendering via a display of the client device.

FIG. 3 illustrates a visualization of an example support user interface for identifying and outputting at least one predicted operational support data object in accordance with at least some embodiments of the present disclosure. Specifically, FIG. 3 illustrates an example support user interface 300. The example support user interface 300 may be rendered to a client device during communication between the client device and a malfunction support apparatus 200, where the client device communicates with the malfunction support apparatus 200 to access predicted operational support data object selection and provision functionality, and/or other support functionality. For example, the client device may render the support user interface 300 within a specially configured native application associated with functionality of the malfunction support apparatus 200, and/or within a browser application utilized to access a web-based application associated with functionality of the malfunction support apparatus 200.

As illustrated, the example support user interface 300 includes a first sub-interface 302. The first sub-interface is associated with displaying interface element(s) associated with a main support transmission process. The main support transmission process may include information inputted by a user associated with malfunction(s) for which support is to be provided. The user may submit various information to the malfunction support apparatus 200 associated with malfunction(s) to be resolved, and/or may receive data in response to such information associated with a particular malfunction classification identifier corresponding to such malfunction(s). In this regard, the first sub-interface 502 may be dynamically updated as the user inputs information to the malfunction support apparatus 200 and/or receives response data from the malfunction support apparatus 200.

As illustrated, the first sub-interface 302 illustrates interface elements associated with a main support transmission process embodying interaction between a user and an automated system that assists the user in diagnosing malfunction(s) and/or resolving such diagnosing malfunction(s). In some embodiments, the user may interact with such an automated system to identify a particular malfunction to resolve, and then the user may be connected to a specialist (e.g., a technician) that may assist the user in resolving the identified malfunction. Alternatively or additionally, in some embodiments, the user may interact with such an automated system to identify the particular malfunction and receive automated instructions for resolving the identified malfunction.

As illustrated, the first sub-interface 302 includes various representations of malfunction text description data, specifically malfunction text description elements 304A, 304B, 304C, 304D, and 304E (collectively "malfunction text description elements 304"). Malfunction text description elements 304B and 304D represent malfunction text description data inputted by a user. Malfunction text description elements 304A, 304C, and 304E represent malfunction text description data provided by the malfunction support apparatus 200. In this regard, the malfunction text description elements 304 embody a conversation associated with diagnosing and/or resolving a particular malfunction. The malfunction text description data provided by the malfunction support apparatus 200 may be predetermined, determined based on a particular rule set, generated via an artificial intelligence and/or machine learning model specifically configured to generate malfunction text description data in response to text received from the user associated with a particular malfunction. As illustrated, the malfunction text description elements 304 indicate the user is experiencing a malfunction associated with their printer (e.g., as indicated in malfunction text description element 304B), specifically a printer of "Printer Brand A, model 1" (e.g., as indicated in malfunction text description element 304D).

The example support user interface 300 further includes a second sub-interface 352. The second sub-interface 352 includes interface elements associated with any number of operational support data object(s). The second sub-interface 352 includes various interface elements, each associated with a predicted operational support data object that is determined and/or otherwise selected to help resolve an identified malfunction. Specifically, the second sub-interface 352 includes a first operational support element 354A associated with a first predicted operational support data object, a second operational support element 354B associated with a second predicted operational support data object, and a third operational support element 354C associated with a third predicted operational support data object (collectively "operational support elements 354). Each of the operational support elements 354 is associated with an operational support data object selected by the malfunction support apparatus 200 as associated with and/or useful in resolving the printer malfunction that the user is experiencing.

One or more of the predicted operational support data objects may correspond to third-party operational support data object(s) hosted and/or otherwise made available via an external data system. In this regard, the corresponding operational support element may provide a link for accessing the third-party operational support data object upon interaction by the user. For example, as illustrated, the first operational support element 354A is associated with a first operational support data object maintained and/or otherwise available at a first URL "www.techsite #1.com/printer," and thus the user may interact with the first operational support element 354A to retrieve and/or otherwise access the first operational support data object via the URL. Similarly, the second operational support element 354B is associated with a second operational support data object maintained and/or otherwise available at a second URL "www.videosite #1.com/watch?A" and thus the user may interact with the second operational support element 354B to retrieve and/or otherwise access the second operational support data object via the URL. Further still, the third operational support element 354C is associated with a third operational support data object maintained and/or otherwise available at a third URL "www.brandAprinter.com/guides/A1" and thus the user may interact with the third operational support element 354C to retrieve and/or otherwise access the third operational support data object via the corresponding URL. It should be appreciated that each of these URLs may correspond to data objects hosted by different system(s) and may be associated with one or more different entities. In this regard, the second sub-interface 352 provides a centralized point of access to various data objects relevant to the particular malfunction the user is experiencing.

In some embodiments, the malfunction support apparatus 200 selects one or more operational support data object(s) to be made accessible via the support user interface 300 via one or more portions of data available to the malfunction support apparatus 200. For example, in some embodiments, the malfunction support apparatus 200 selects predicted operational support data object(s) based at least in part on malfunction text description data inputted by a user (e.g., the malfunction text description data represented in the corresponding first sub-interface 302). Additionally or alternatively, in some embodiments, the malfunction support apparatus 200 selects predicted operational support data object(s) based at least in part on device activity data retrieved associated with a particular user and/or communications network, as described herein. Alternatively or additionally still, in some embodiments, the malfunction support apparatus 200 selects predicted operational support data object(s) based at least in part on other support activity data associated with the particular user, as described herein. The malfunction support apparatus 200 may utilize any such data to identify a malfunction classification identifier that corresponds to the malfunction that has occurred, and may select predicted operational support data object(s) that are associated with the malfunction classification identifier as assisting in resolving the malfunction corresponding to the identified malfunction classification identifier.

FIG. 4 illustrates another visualization of an example support user interface for identifying and outputting at least one predicted operational support data object in accordance with at least some embodiments of the present disclosure. Specifically, FIG. 4 illustrates an example support user interface 400. The example support user interface 400 may be rendered to a client device during communication between the client device and a malfunction support apparatus 200, where the client device communicates with the malfunction support apparatus 200 to access predicted operational support data object selection and provision functionality, and/or other support functionality. For example, the client device may render the support user interface 400 within a specially configured native application associated with functionality of the malfunction support apparatus 200, and/or within a browser application utilized to access a web-based application associated with functionality of the malfunction support apparatus 200.

The example support user interface 400 includes a first sub-interface 402 associated with connecting and/or interacting with a technician to resolve a malfunction. For example, the example support user interface 400 in some embodiments is rendered to a client device during a support session initiation period (e.g., after the user requests to be connected with a technician). In this regard, the first sub-interface 402 may depict a waiting message, image, video, and/or other content upon initiation while attempting to connect the client device with an appropriate technician device that may assist in diagnosing and/or resolving a particular identified malfunction. In some embodiments, once a technician device is identified and connected with the client device, the first sub-interface 402 may dynamically update to include a real-time communications interface (e.g., a chat interface) between the client device and the technician device. In some embodiments, the technician embodies a customer service representative. In this regard, a user may utilize a malfunction support session to communicate particular text to the technician for processing, analysis, and/or the like, to assist in resolving one or more malfunction(s) associated with a networked device, a dynamic home communications network, and/or the like. Additionally, at least a portion of functionality (e.g., search functionality) may be provided before a malfunction support session is fully initiated. In some embodiments, the support session initiation period terminates once a malfunction support session is established with a particular technician device or a particular technician.

As illustrated, the first sub-interface 402 includes a search element 404. The search element 404 includes support search data 406 inputted by a user. The support search data 406 may embody malfunction text description data that indicates a particular malfunction to be resolved. In this regard, the user may input the support search data 406 in an attempt to search for operational support data object(s) and/or initiate a connection with a technician device corresponding to a technician with sufficient capabilities to resolve a particular malfunction. In some embodiments, the support search data 406 is extracted from the search element 404 and processed to determine a malfunction classification identifier corresponding to the malfunction indicated as affecting one or more networked devices, and/or to select one or more predicted operational support data object(s) for outputting.

In some embodiments, the malfunction support apparatus 200 processes the support search data 406 to select one or more predicted operational support data object(s) for outputting. As illustrated, the support user interface 400 similarly includes the second sub-interface 352, which comprises each of the operational support elements 354. In this regard, the malfunction support apparatus 200 may automatically, and in some embodiments dynamically, render the operational support elements to the second sub-interface 352 within the support user interface 400 in response to user input by the user of the client device. For example, in some embodiments, the malfunction support apparatus 200 receives the support search data 406 in real-time upon submission of such input by the user, and processes the support search data 406 to identify one or more malfunction classification identifier(s), and/or output predicted operational support data object(s) for such malfunction classification identifier(s) in real-time in response to such input. In this regard, a user may interact with one or more of the predicted operational support data object(s) corresponding to the operational support elements 354 to attempt to resolve the malfunction(s) while awaiting connection with a technician device. In some embodiments, the initiated connection with a technician device may be subsequently terminated, for example, in circumstances where a predicted operational support data object is provided that is determined as above a certain threshold likeliness to resolve the malfunction(s) associated with the malfunction classification identifier(s), where user input associated with one more of the predicted operational support resources represented by the operational support elements 354 is received, where user input is received indicating the predicted operational support data object(s) associated with the operational support elements 354 assisted in resolving the malfunction(s), and/or the like. In this regard, one or more such data-determined circumstances during a support session initiation period may short circuit establishment of a malfunction support session and terminate any such process(es) initiated for initializing such a connection, searching for a technician or technician device, establishing a connection with the technician or technician device, and/or the like.

In some embodiments, a support user interface is dynamically updated as a user interacts with the support user interface. For example, additional, updated malfunction text description data may be rendered to the support user interface as a user inputs such additional malfunction text description data. Additionally or alternatively, the predicted operational support data object(s) may be dynamically updated, for example in real-time or near real-time, as such user inputs are received. For example, as additional malfunction text description data is received, the malfunction support apparatus 200 may select one or more updated predicted operational support data objects for outputting in real-time based on at least the additional malfunction text description data.

FIGS. 5A and 5B illustrates visualizations of a dynamically-updated example support user interface for identifying and outputting at least one predicted operational support data object in accordance with at least some embodiments of the present disclosure. Specifically, FIG. 5A and FIG. 5B depict dynamic updating of an example support user interface 500 in response to updated malfunction text description data. It should be appreciated that the example support user interface 500 may be dynamically updated any number of times, for example each time additional malfunction text description data is received by the malfunction support apparatus 200 and/or upon selection of updated operational support data object(s) by the malfunction support apparatus 200.

FIG. 5A depicts the example support user interface 500 in a first state before being dynamically updated. As illustrated, the example support user interface 500 includes a first sub-interface 502. The first sub-interface 502 includes various interface elements associated with communications transmitted between a technician device and a client device during a malfunction support session. In this regard, during the malfunction support session, any number of message data object(s) may be transmitted between the technician device and the client device, each message embodying malfunction text description data. As illustrated, the first sub-interface 502 includes malfunction text description elements 504A and 504C transmitted via a technician device associated with a technician, and malfunction text description elements 504B transmitted via a client device associated with a user (collectively, all malfunction text description elements referred to as "malfunction text description elements 504").

In some such embodiments, the malfunction support apparatus 200 may receive the malfunction text description data represented by each of the malfunction text description elements 504 as it is inputted via the client device and/or technician device. Alternatively or additionally, in some embodiments, the malfunction support apparatus 200 may process the received malfunction text description data to select one or more predicted operational support data objects for outputting via the example support user interface. For example, in some embodiments the malfunction support apparatus 200 applies at least the malfunction text description data to an operational support processing data model that selects the predicted operational support data object(s) for outputting. In some such embodiments, as described herein, the operational support processing data model may generate a score representing the likelihood that a particular operational support data object will be associated with and/or otherwise assist in resolving a malfunction represented by one or more particular malfunction classification identifier(s). Additionally or alternatively, the operational support processing data model may select predicted operational support data objects that are associated with such scores that satisfy a particular score threshold.

As illustrated, the example support user interface 500 includes a second sub-interface 552. The second sub-interface 552 includes a first operational support element 554A associated with a first predicted operational support data object. The first predicted operational support data object may be selected as the operational support data object that most likely will assist in resolving a malfunction indicated by and/or determined at least via malfunction text description data, for example a malfunction represented by a malfunction classification identifier determinable from at least the malfunction text description represented in the malfunction text description elements 504. In some embodiments, the malfunction support apparatus 200 may score any number of possible operational support data object(s) and/or otherwise determine the first predicted operational support data object associated with the first operational support element 554A is the only operational support data object associated with a score satisfies an applicable score threshold.

FIG. 5B depicts the example support user interface in accordance with a second state upon and/or after being dynamically updated, the second state represented by example support user interface 510. As illustrated, the example support user interface 510 includes the first sub-interface 502. The first sub-interface 502 reflects updated, additional malfunction text description data represented by the updated malfunction text description elements 506A and 506B. In this regard, the updated malfunction text description element 506A may embody updated malfunction text description data inputted via a client device, for example in response to the message embodying the malfunction text description data represented in malfunction text description element 504C. Additionally or alternatively, the updated malfunction text description element 506A may embody additional malfunction text description data inputted via a technician device, for example in response to the message embodying the malfunction text description data represented in malfunction text description element 506A.

The updated, additional malfunction text description data may be processed to better identify the specific malfunction affecting the client device and/or an associated networked device. For example, the malfunction text description element 506A indicates that a malfunction is affecting a printer having device characteristics of being brand identified by "Printer Brand A" and a model identified by "model 1." Such updated, updated malfunction text description data may be dynamically reflected via updates to the first sub-interface 502 upon input via the client device and/or technician device respectively.

As illustrated in the example support user interface 510, the second sub-interface 552 similarly includes dynamic updates to the interface elements represented therein. Specifically, as illustrated, the second sub-interface 552 includes interface elements associated with additional, updated operational support data objects. For example, the second sub-interface 552 includes a first additional, updated operational support element 556A associated with a first additional, updated operational support data object, and a second additional, updated operational support element 556B associated with a second additional, updated operational support data object.

The malfunction support apparatus 200 may select the additional, updated operational support data objects based at least in part on the additional, updated malfunction support text data. For example, the malfunction support apparatus 200 may receive the additional, updated malfunction text description data represented in the additional, updated malfunction text description elements 506A and 506B and apply at least such additional, updated malfunction text description data to an operational support processing data model. The operational support processing data model may select one or more predicted operational support data objects based at least in part on the updated malfunction text description data, for example to select predicted operational support processing data objects with an improved likelihood to be associated with and/or help resolve malfunction(s) associated with one or more identified malfunction classification identifier(s). In this regard, the operational support processing data model may select the predicted operational support data object(s) corresponding to the updated operational support elements 556A and 556B. For example, the operational support processing data model may re-score any number of possible operational support data object(s) based at least in part on the updated, additional malfunction text description data.

In some embodiments, the operational support elements corresponding to the predicted operational support data object(s) selected are rendered based at least in part on the score(s) and/or determinations associated with the predicted operational support data object(s). For example, in some embodiments, the predicted operational support data objects are each scored by the operational support processing data model, and subsequently the support user interface is configured to render the predicted operational support data objects in decreasing order (e.g., beginning with the top-scored predicted operational support data object). For example, as illustrated, the predicted operational support data object associated with the updated operational support element 556A may be scored higher than the predicted operational support data object associated with the operational support element 556B, and the predicted operational support data object associated with the operational support element 556B may be higher scored than the predicted operational support data object associated with the operational support element 554A. Additionally or alternatively, in some embodiments, an operational support element may be rendered associated with only the highest scoring predicted operational support data object.

The second sub-interface 552 may be dynamically updated in any of a myriad of ways. In some embodiments, for example, operational support element(s) associated with previously outputted predicted operational support data object(s) may continue to be included in the second sub-interface 552. Alternatively or additionally, in some embodiments, operational support element(s) associated with previously outputted predicted operational support data object(s) may be replaced with the updated selected operational support data object(s). For example, in some other embodiments, the operational support element 554A may be replaced upon dynamically updating of the second sub-interface 552 with additional, updated predicted operational support data object(s).

The support user interface may continuously dynamically update as interactions occur via the support user interface. For example, as additional, updated malfunction description text is inputted associated with a malfunction support session, the predicted operational support data object(s) selected may be updated based on such additional, updated malfunction description text. In this regard, as additional context is made available via the additional, updated malfunction text description data, such additional context may be processed to identify a more likely malfunction classification identifier(s) based on the additional context and/or select updated predicted operational support data objects that are more likely to be useful to resolve malfunction(s) indicated by the context and/or associated malfunction classification identifier(s). As such, the support user interface may continuously remain updated with interface elements associated with operational support data object(s) that may be most likely to assist a user in diagnosing and/or resolving a malfunction indicated as affecting one or more networked device(s).

The malfunction text description data (and/or other available data such as device activity data, other support activity data, and/or the like) may be used to identify particular malfunction classification identifier(s) and/or associated prediction operational support data objects relevant to a particular user profile and/or dynamic home communications network. In this regard, the malfunction text description data (alone or in combination with such other data) may be used to train the operational support processing data model to identify such relevant malfunction classification identifier(s) and/or associated predicted operational support data object(s) for selection. The malfunction text description data thus may serve as one such input to a trained model, such as an operational support processing data model, used to identify the malfunction classification identifier and/or predicted operational support data objects most likely to assist in resolving a malfunction associated with a user profile, such as a malfunction classification identifier representing a particular malfunction indicated as affecting a networked device and/or dynamic home communications network associated with the user profile. In the particular example context depicted and described in FIG. 5B, for example, malfunction text description data associated with malfunction text description element 504B may be processed to higher weight (e.g., via a data model) malfunction classification identifier(s) and/or operational support data object(s) associated with printer problems, and/or in combination with other input data (e.g., device activity data and/or other support activity data) malfunction classification identifier(s) and/or operational support data object(s) associated with the particular printers that are currently active, or previously active, on a dynamic home communications network associated with the user profile. Similarly, the malfunction text description data associated with malfunction text description element 504D, alone or in combination with other input data, may be further processed to refine such weights, such as by higher weighting malfunction classification identifier(s) and/or operational support data object(s) associated with the particular printer of printer brand A, model 1. In this regard, as malfunction text description data is dynamically updated, it should be appreciated that a data model may be reapplied and/or otherwise subsequently executed to similarly dynamically update the weights for particular malfunction support classification identifier(s) and/or predicted operational support data object(s) to reflect data best predicted to be relevant to a particular user profile based at least in part on newly inputted malfunction text description data.

Example Data Environment of the Disclosure

Having described example systems, apparatuses, computing environments, and interfaces of the disclosure, example data environments including visualizations of data elements and interactions between such data elements will now be described. It will be appreciated that the particular visualizations of data elements are exemplary, and that in some embodiments the data elements may be actually embodied utilizing any of a myriad of data configurations, data types, value(s). In this regard, the particular visualizations of data elements and interactions between such data elements for non-limiting purposes of understanding, and are not to limit the scope and spirit of the disclosure and the appended claims herein.

FIG. 6 illustrates an example data representation of operational support data objects storage within an operational support management repository in accordance with at least some embodiments of the present disclosure. Specifically, FIG. 6 depicts an operational support management repository 602 configured to store any number of operational support data objects, for example each of the operational support data objects 604A, 604B, 604C, 604D, and 604E (collectively "operational support data objects 604). In some embodiments, the operational support management repository 602 is embodied by, included in, and/or otherwise maintained by a malfunction support apparatus 200. Additionally or alternatively, in some embodiments, the operational support management repository 602 is embodied by, included in, and/or otherwise maintained by a separate device, system, and/or apparatus, and the malfunction support apparatus 200 is configured to access the operational support management repository 602. For example, in some such embodiments, the operational support management repository 602 may be maintained separately to enable regular and/or continuous updates to the operational support management repository 602 without affecting operation of the malfunction support apparatus 200 (e.g., addition of new operational support data object(s) stored to the repository, deletion of outdated, obsolete, and/or other marked operational support data object(s) previously stored to the repository, updating of operational support data object(s) stored to the repository, and/or the like).

The operational support management repository 602 may include one or more computing devices embodied in hardware, software, firmware, and/or a combination thereof. For example, the operational support management repository 602 may include one or more virtual database(s), physical database server(s), software-based storage solutions, and/or the like, that stores operational support data object(s). The operational support management repository 602 may store any number of operational support data objects, for example each representing computer-executable instructions, software application(s), web-resource(s), and/or other content that assists in resolving one or more malfunction(s).

In some embodiments, the operational support management repository 602 stores third-party malfunction support data objects. Each third-party operational support data object may embody a data link (e.g., a URL, IP address, and/or the like) or other data-driven mechanism for accessing a data object stored by a device, system, and/or other computing device external to the operational support management repository 602 and/or the malfunction support apparatus 200. In this regard, the third-party operational support data object may enable access to the other data object stored by the external data system. Each third-party operational support data object may be maintained by a different external system and/or associated with a different provider entity that controls the data system storing the data object retrieved via the third-party operational support data object. For example, two different third-party operational support data objects may be associated with the same provider entity, but accessible via different external systems associated with the same provider entity. Alternatively or additionally, two different third-party operational support data objects may be associated with different provider entities and accessible via different external systems. Additionally or alternatively still, in some embodiments, the operational support management repository 602 stores operational support data objects that do not require access via an external data system (e.g., files, internal links, and/or other resources having content stored in the operational support management repository 602 embodied therein). In this regard, the operational support management repository 602 advantageously provides a centralized mechanisms for enabling access to operational support data object(s) regardless of whether the data corresponding to such operational support data objects are locally stored or externally maintained.

As illustrated, each of the operational support data objects 604 embodies a data link to a data object associated with resolving one or more malfunction(s). The various operational support data objects 604 are associated with various provider identifiers, specifically provider identifiers representing Providers 1, 2, 3, and 4. Each of the providers may maintain any number of systems for storing and/or otherwise making accessible data associated with one or more operational support data objects. In some embodiments, one or more of the provider identifiers corresponding to the entity that controls the operational support management repository 602 and/or the malfunction support apparatus 200. Alternatively or additionally, in some embodiments, each of the provider identifiers corresponds to a third-party entity that controls one or more data systems external to the operational support management repository 602 and/or malfunction support apparatus 200. As depicted, operational support data object 604A and operational support data object 604B are each associated with Provider 1, operational support data object 604C is associated with Provider 2, operational support data object 604D is associated with Provider 3, and operational support data object 604E is associated with Provider 4.

The operational support data object 604A embodies a first third-party operational support data object associated with web content hosted by the Provider 1. For example, the third-party operational support data object embodies a web page 606A hosted by an external system controlled by Provider 1. The web page includes various content, including text content associated with connecting a printer to a home network. In this regard, the third-party operational support data object stored to the operational support management repository 602 may embody the URL utilized to retrieve the web page from the external system hosting the web page.

The operational support data object 604E embodies a second third-party operational support data object associated with web content hosted by the Provider 4. For example, the third-party operational support data object embodies a web page 606B hosted by an external system controlled by Provider 4. The web page includes various content, including text content associated with determining why a computing device's battery may consistently seem low powered. In this regard, it should be appreciated that the third-party operational support data object stored to the operational support management repository 602 may embody the URL utilized to retrieve the web page from the external system hosting the web page. The operational support data object 604A may be outputted and utilized to access the corresponding data (e.g., the web page 606A) in circumstances where an identified malfunction classification identifier represents a printer malfunction. Similarly, the operational support data object 604E may be outputted and utilized to access the corresponding data (e.g., web page 606B) in circumstances where an identified malfunction classification identifier represents a battery life malfunction. For example, an operational support processing data model may be trained to identify the malfunction classification identifiers indicated by data associated with a particular set of device(s), communications network, and/or user profile (e.g., device activity data, support activity data, malfunction text description data, and/or the like).

It will be appreciated that, in some embodiments, the operational support data object(s) stored to the operational support management repository 602 includes one or more third-party operational support data object(s) having content stored external from the operational support management repository 602. In some such embodiments, the operational support data object(s) stored to the operational support management repository 602 embody a data pointer usable to retrieve such content and/or associated context from an external location (e.g., another database, server, and/or the like). In some such embodiments, the content pointed to by the third-party operational support data object may be updated without requiring updating of the corresponding third-party operational support data object. In this regard, such embodiments utilize third-party operational support data object(s) to reduce storage requirements of the operational support management repository 602 (e.g., by reducing the need to store content therein, which often is significantly more resource intensive than data pointer(s)) and reduces or eliminates any need for the operational support management repository 602 to be updated to update content pointed to by a particular third-party operational support data object.

FIG. 7 illustrates an example data representation of operational support data objects associated with malfunction classification identifiers in accordance with at least some embodiments of the present disclosure. In some embodiments, the associations between malfunction classification identifiers and operational support data object(s) are maintained by the malfunction support apparatus 200. For example, in some embodiments, the associations between malfunction classification identifiers and operational support data object(s) are stored in an operational support management repository. For example, each operational support data object may be embodied by one or more data record(s) stored in the operational support management repository that include the malfunction classification identifier(s) with which the operational support data object is associated. Alternatively or additionally, in some embodiments, the associations between operational support data object(s) and malfunction classification identifier(s) is stored in one or more other repositories maintained by and/or accessible to the malfunction support apparatus 200.

Specifically, as depicted, FIG. 7 depicts associations between the operational support data objects 604 and various malfunction classification identifiers 702A, 702B, 702C, and 702D. The malfunction classification identifier 702A represents a classification of system events embodying malfunctions in connecting new devices to a communications network (e.g., a home network). The malfunction classification identifier 702B represents a classification of system events embodying malfunctions with operation of a printer having a make of Printer Brand A. The malfunction classification identifier 702C represents a classification of system events embodying malfunctions of a printer generally.

The malfunction classification identifier 702D represents a classification system events embodying malfunctions resulting in decreased device battery life. It should be appreciated that a first malfunction classification identifier may represent a more detailed and/or narrowed classification of malfunction(s) represented by a second malfunction classification identifier. For example, "Printer Problems" may encompass all various malfunctions for various types, makes, and/or models of printer, and "BRAND A Printer Problems" may encompass a subset of such malfunctions specific to printers having a make of Printer Brand A, Similarly, a malfunction classification identifier of "BRAND A MODEL 1 Printer Problems" may encompass a subset of the malfunctions of the malfunction classification identifier "BRAND A Printer Problems," specifically the malfunctions associated with the Model 1 of Brand A printer. As such, malfunction classification identifiers may be generated to represent any level of specificity and/or detail with respect to device characteristics, data properties, and/or the like. The malfunction classification identifier 702D represents a classification system events embodying malfunctions resulting in decreased device battery life.

In some embodiments, each association between an operational support data object and a malfunction classification identifier indicates the operational support data object assists in resolving one or more malfunction(s) represented by the malfunction classification identifier. For example, as depicted, operational support data object 604A is associated with malfunction classification identifier 702A, 702B, and 702C. In this regard, the association with malfunction classification identifier 702A indicates that the operational support data object 604A may assist in resolving a malfunction involving connection of a new networked device, the association with malfunction classification identifier 702B indicates that the operational support data object 604A may assist in resolving a malfunction involving a printer having a make of Brand A, and the association with malfunction classification 702C indicates that the operational support data object 604A may assist in resolving a malfunction involving a printer generally. Alternatively, operational support data object 604B is associated with malfunction classification identifier 702B and malfunction classification identifier 702C, indicating that the operational support data object 604B similarly may assist in resolving a malfunction involving a printer having a make of Brand A and/or involving a printer generally, but not a malfunction involving connection of a new networked device (e.g., no association with malfunction classification identifier 702A is established).

Further still, operational support data objects 604C and 604D are each associated only with malfunction classification identifier 702C. Such associations may indicate that each of the operational support data objects 604C and 604D may assist in resolving a malfunction involving a printer generally, but not specific to a printer having a make of Brand A and/or resolving a malfunction involving connection of a new device. For example, operational support data object 604C may be associated with or otherwise include text data, software application(s), video content data, image content data, and/or the like, that assists in resolving malfunctions associated with a printer cartridge for an inkjet printer. Similarly, operational support data object 604D may be associated with or otherwise include text data, software application(s), video content data, image content data, and/or the like, that assists in resolving malfunctions associated with operation of a printhead for a thermal printer.

Finally, operational support data object 604E is associated only with malfunction classification identifier 702D. Such an association indicates that the operational support data object 604E may assist in resolving a malfunction involving a diminished battery life of a networked device. In this regard, the operational support data object 604E may not assist in resolving any malfunction represented by one or more of the other malfunction classification identifiers 702A, 702B, and/or 702C. For example, the operational support data object 604E may be associated with or otherwise include text data, software application(s), video content data, image content data, and/or the like, that assists in resolving malfunctions associated with degraded and/or otherwise diminished battery life (e.g., diagnosing hardware thermal fatigue issues, software applications draining significant battery life, and/or the like).

Such association(s) between an operational support data object and one or more malfunction classification identifier may be generated manually and/or automatically based at least in part on processing of the operational support data object and/or malfunction classification identifier. For example, in some embodiments, a database administrator of the repository in which such associations are stored (e.g., a database administrator of the operational support management repository) may generate and/or store such association(s) based on the content of the operational support data object. Alternatively or additionally, in some embodiments, the malfunction support apparatus 200 processes content, metadata, and/or any other data associated with the operational support data object to generate associations between the operational support data object and one or more malfunction classification identifier(s). For example, in some embodiments, the malfunction support apparatus 200 may utilize natural language processing to determine which malfunctions are discussed in content data for a particular operational support data object. The malfunction support apparatus 200 may associate the operational support data object with malfunction classification identifier(s) that represent the malfunction(s) identified in such content data.

In some such embodiments, the malfunction support apparatus 200 associates the operational support data object with malfunction classification identifier(s) that represent the malfunction(s) identified in such content data. In some embodiments, text processing, pattern recognition, image recognition, and/or any other algorithm(s) for processing content of an operational support data object is/are utilized to generate a malfunction classification identifier associated with the operational support data object, and/or to associate the operational support data object with an existing malfunction classification identifier. For example, in some embodiments, an operational support data object may be processed to determine a most prominent topic, malfunction, device, device type or other categorical grouping, and/or the like, referred to in the content of the operational support data object. In some such embodiments, the operational support data object is associated with a malfunction classification identifier determined associated with the determined topic, malfunction, device, device type or other categorical grouping, and/or the like.

FIG. 8 illustrates an example visualization of predicted operational resource selection utilizing an operational support processing data model in accordance with at least some embodiments of the present disclosure. Specifically, FIG. 8 depicts an example operational support processing data model 808 that selects and/or outputs at least a predicted operational support data object(s) 810 based on one or more input portions of data. In this regard, the malfunction support apparatus 200 may maintain the operational support processing data model 808 for selecting the predicted operational support data object(s) 810. The operational support processing data model 808 may be previously trained based on the particular type of input data to be utilized to select operational support data object(s).

The operational support processing data model 808 may be embodied in any of a myriad of manners. For example, in some embodiments the operational support processing data model 808 is embodied by one or more specially configured and/or trained algorithmic, statistical, and/or machine learning models, or a combination thereof. The operational support processing data model 808 may be configured and/or trained utilizing supervised learning and/or unsupervised learning. For example, in some embodiments, the operational support processing data model 808 is embodied by one or more regression model(s), random forest model(s), KNN model(s), and/or the like. In some embodiments, the operational support processing data model 808 is embodied by one or more k-means model(s), clustering model(s), and/or the like. In some embodiments, the operational support processing data model 808 embodies an artificial intelligence specially configured to select the predicted operational support data object(s) 810 based at least in part on the input data.

As illustrated, the operational support processing data model 808 takes at least device activity data set 802 as input. In some embodiments, the device activity data 802 includes various data received, requested, and/or otherwise detected for one or more networked device(s), communications networks, and/or requesting client devices to be processed for providing predicted operational data object(s) associated with identified malfunction(s). Such device activity data 802 may include, without limitation, one or more configuration logs, device identification data, connection(s) between devices, and/or the like associated with such networked device(s), communications network(s), client device(s), and/or the like. In this regard, the device activity data 802 may include various data relevant to identifying particular computing device(s), data characteristics of such computing device(s), and/or the like. Additionally or alternatively, in some embodiments, the device activity data 802 may include various data indicating current configurations of such computing device(s) and/or changes in configurations of the computing device(s).

In some embodiments, the device activity data 802 is received from the malfunction support apparatus 200 for processing. The device activity data 802 may be received from a requesting client device that collects portions of the device activity data from each networked device communicable with the requesting client device over one or more communications networks at any number of time interval(s). Alternatively or additionally, in some embodiments, the malfunction support apparatus 200 requests the device activity data from a requesting client device and/or one or more networked device(s) directly. The malfunction support apparatus 200 may request the device activity data 802 upon initiation of a malfunction support session, at regular time intervals, upon receiving other input data (e.g., malfunction text description data), and/or the like. Alternatively or additionally still, in some embodiments, the malfunction support apparatus 200 detects the device activity data. For example, the malfunction support apparatus 200 may process transmission messages, networking packets, and/or other data communicated over a particular communications network to determine the device activity data 802 from the metadata and/or data therein. In some embodiments, the device activity data is collected and/or requested by the malfunction support apparatus 200 over a particular timestamp interval. For example, upon initiation of the process for selecting predicted operational support data objects, the malfunction support apparatus 200 may request and/or otherwise retrieve (e.g., from a buffer of stored device activity data) device activity for one or more networked devices over a predefined timestamp interval (e.g., the last day, hour, and/or the like).

As illustrated, optionally in some embodiments, the operational support processing data model 808 additionally or alternatively takes as input at least support activity data 804. In some embodiments, the support activity data 804 includes various data associated with operations performed by a user for diagnosing and/or attempting resolution of one or more malfunction(s). Such support activity data 804 may include, without limitation, support search data, malfunction text description data, previously accessed operational support data objects, and/or external query data performed via one or more networked device(s). In this regard, the support activity data 804 may include various data relevant to particular support related actions performed by a user for diagnosing and/or attempting to resolve one or more malfunction(s). In some embodiments, the operational support processing data model 808 is utilized in addition to and/or alternative to one or more other process(es) that, manually or via another automatic computer-implemented process, identifies a particular malfunction, corresponding predicted operational support data object(s), and/or the like.

In some embodiments, the support activity data 804 is received by the malfunction support apparatus 200 for processing. The support activity data 804 may be received from a requesting client device in response to request(s) by the malfunction support apparatus 200. In some embodiments, the malfunction support apparatus 200 requests the support activity data 804 at particular time interval(s) and/or upon determination of particular event occurrence(s). For example, in some embodiments, the malfunction support apparatus 200 requests the support activity data 804 from a requesting client device and/or associated networked device(s) in response to receiving data requesting and/or triggering initiation of a malfunction support session. Alternatively or additionally, in some embodiments, the malfunction support apparatus 200 receives and stores some or all of the support activity data 804 as the requesting client device interacts with the malfunction support apparatus 200. For example, the malfunction support apparatus 200 may receive and store support activity data 804 comprising malfunction text description data inputted via the requesting client device and/or an associated networked device during a main support process, such as a malfunction support session. Alternatively or additionally, in some embodiments for example, the malfunction support apparatus 200 receives and stores support search data via the requesting client device, indicating a user request to initiate a malfunction support session.

Additionally or alternatively still, optionally in some embodiments, the operational support processing data model 808 takes as input at least an operational support data object set 806. The operational support data object set 806 may embody a set including any number of operational support data object(s) available for selection by the operational support processing data model 808. In some embodiments, the malfunction support apparatus 200 retrieves the operational support data object set 806 from an operational support management repository. The operational support data object set 806 may include all available operational support data objects, or in some embodiments may include a particular subset of available operational support data objects. For example, in some embodiments, a malfunction classification identifier is identified before processing via the operational support processing data model 808, and the operational support data object set 806 may include the subset of available operational support data objects that are associated with the identified malfunction classification identifier.

As illustrated, optionally in some embodiments, the operational support processing data model 808 additionally or alternatively takes as input at least support activity data 804. In some embodiments, the support activity data 804 includes various data associated with operations performed by a user for diagnosing and/or attempting resolution of one or more malfunction(s). Such support activity data 804 may include, without limitation, support search data, malfunction text description data, previously accessed operational support data objects, and/or external query data performed via one or more networked device(s). In this regard, the support activity data 804 may include various data relevant to particular support related actions performed by a user for diagnosing and/or attempting to resolve one or more malfunction(s).

In some embodiments, the support activity data 804 is received by the malfunction support apparatus 200 for processing. The support activity data 804 may be received from a requesting client device in response to request(s) by the malfunction support apparatus 200. In some embodiments, the malfunction support apparatus 200 requests the support activity data 804 at particular time interval(s) and/or upon determination of particular event occurrence(s). For example, in some embodiments, the malfunction support apparatus 200 requests the support activity data 804 from a requesting client device and/or associated networked device(s) in response to receiving data requesting and/or triggering initiation of a malfunction support session. Alternatively or additionally, in some embodiments, the malfunction support apparatus 200 receives and stores some or all of the support activity data 804 as the requesting client device interacts with the malfunction support apparatus 200. For example, the malfunction support apparatus 200 may receive and store support activity data 804 comprising malfunction text description data inputted via the requesting client device and/or an associated networked device during a main support process, such as a malfunction support session. Alternatively or additionally, in some embodiments for example, the malfunction support apparatus 200 receives and stores support search data via the requesting client device, indicating a user request to initiate a malfunction support session.

It should be appreciated that the operational support processing data model 808 may be trained on and/or take as input any additional and/or alternative data relevant to determining the predicted operational support data object(s) most likely to assist a user in resolving one or more malfunction(s). In this regard, the operational support processing data model 808 may be trained and/or take as input any data relevant to the particular communications network and/or networked devices, support actions performed associated therewith, external system data associated with particular device(s) and/or malfunction(s), and/or the like. For example, the operational support processing data model 808 may be trained based at least in part on social media data, web articles, blog posts, and/or the like, that indicate particular malfunction(s) commonly affecting particular device(s), device type(s), and/or the like.

In some embodiments, the operational support processing data model 808 outputs predicted operational support data object(s) 810 based at least in part on the input data. The predicted operational support data object(s) 810 may embody operational support data object(s) determined as sufficiently likely to assist in resolving a malfunction associated with an identified malfunction classification identifier. In this regard, the predicted operational support data object(s) 810 may each be output to enable access to the operational support data object and/or content therein for use in attempting to resolve the malfunction (e.g., automatically or via user-initiated actions based at least in part on one or more of the predicted operational support data object(s) 810).

In some embodiments, the operational support processing data model 808 generates a confidence score for one or more operational support data object(s) (e.g., each operational support data object of the operational support data object set 806). The confidence score for each operational support data object may represent a likelihood that the operational support data object is associated with attempting to resolve a particular identified malfunction classification identifier. For example, in some embodiments, the operational support processing data model 808 processes some or all of the input data (e.g., the device activity data 802 and/or support activity data 804) to identify a malfunction classification identifier representing one or more malfunction(s) affecting networked device(s) communicable with and/or otherwise associated with a particular requesting client device. Alternatively or additionally, in some embodiments, the operational support processing data model 808 receives the identified malfunction classification identifier as input. The generated confidence score for each operational support data objects thus may embody the likelihood and/or confidence the malfunction support apparatus 200 has that the operational support data object will assist in resolving the malfunction(s) associated with the identified malfunction classification identifier.

In some embodiments, the operational support processing data model 808 selects the predicted operational support data object(s) 810 based on the confidence score for each operational support data object. For example, in some embodiments, the operational support processing data model 808 is configured to select and output a determinable number of predicted operational support data object(s) 810 that are associated with the highest confidence scores. For example, in some embodiments, the top 1, top 3, top 10%, and/or other determinable number of operational support data object(s) having the highest confidence scores are selected and/or output. Alternatively or additionally, in some embodiments, the operational support processing data model 808 selects and/or outputs predicted operational support data object(s) 810 embodying all operational support data object(s) satisfying a particular minimum score threshold. In some such embodiments, any number of predicted operational support data object(s) may be identified based on the scores (e.g., confidence scores) generated via the operational support processing data model 808.

The predicted operational support data object(s) may be utilized in any of a myriad of manners. In some embodiments, the malfunction support apparatus 200 outputs the predicted operational support data object(s) 810 to a requesting client device. The requesting client device may be caused to render the predicted operational support data object(s) 810 via a support user interface. In some such embodiments, a user of the requesting client device may analyze the predicted operational support data object(s) 810 rendered via the requesting client device and determine whether or not to interact with any of said predicted operational support data object(s). In a circumstance where one or more of the predicted operational support data object(s) 810 is interacted with, a main support process (e.g., a malfunction support session) may be interrupted and/or terminated. Alternatively or additionally, in some embodiments, user input may be received indicating one or more accessed data objects of the predicted operational support data object(s) 810 assisted in resolving one or more malfunction(s), and the malfunction support apparatus 200 may terminate a main support process in response to receiving such an indication.

In some embodiments, the operational support processing data model 808 outputs a malfunction classification identifier 812. The malfunction classification identifier 812 may represent one or more malfunction(s) associated with a requesting client device, networked devices communicable therewith, and/or a communications network. In some embodiments, the operational support processing data model 808 is configured to select the malfunction classification identifier from one or more portions of the input data. For example, in some embodiments, the operational support processing data model 808 is configured to select the malfunction classification identifier 812 based at least in part on the device activity data 802 and/or the support activity data 804. In one such example context, the malfunction support apparatus 200 may determine malfunctions indicated as affecting one or more networked devices based on the support activity data 804 (e.g., from malfunction text description data embodied therein), and may identify the networked devices corresponding to such malfunction(s) based at least in part on the device activity data 802. In this regard, in some embodiments, the operational support processing data model 808 scores each possible malfunction classification identifier and selects and outputs the malfunction classification identifier 812 associated with the highest score.

It should be appreciated that, in other embodiments, the operational support processing data model 808 includes one or more sub-models. For example, in some embodiments, the operational support processing data model 808 comprises a first sub-model that is specially configured and/or trained to select the predicted operational support data object(s) 810 and a second sub-model that is specially configured and/or trained to select the malfunction classification identifier 812. Alternatively or additionally, in some embodiments, a second model separate from the operational support processing data model 808 is specially configured and/or trained to select the malfunction classification identifier 812.

In some embodiments, the operational support processing data model 808 is trained to identify particular trends, patterns, and/or other relationships between malfunctions represented by malfunction classification identifier(s). For example, in some embodiments, the operational support processing data model determines a causal relationship between such malfunctions, such that resolving the causal malfunction resolves one or more other malfunctions. In some such embodiments, the operational support processing data model 808 determines such causal relationships based at least in part on patterns, trends, and/or other relationships determined from the various training data sets. For example, device activity data and/or support activity data may include data indicating that if a particular malfunction is indicated, one or more other malfunction(s) often or always are indicated as well. A non-limiting example of a causal malfunction (e.g., a malfunction causing one or more other malfunctions) is an improperly configured network access point that blocks connection from networked devices accessing a particular port range. In this regard, device activity data may indicate attempts to connect and/or configure individual networked devices that attempt to access the particular port range, thus indicating such additional malfunction(s) (e.g., connectivity problems with the individual devices). In this regard, the operational support processing data model may identify and/or associate the causal malfunction with one or more additional malfunction(s) that are indicated by the inputted training data as occurring together (e.g., in a daisy chain or otherwise simultaneous effect). The operational support processing data model 808 may then be trained to identify causal malfunction(s) and higher weight operational support data objects associated with resolving such causal malfunction(s).

It should further be appreciated that the operational support processing data model 808 may be trained based on (and/or otherwise take as input) any of a myriad of types of training data sets, including additional data not depicted that is additional to and/or associated with the device activity data 802 and/or support activity data 804, and may be trained for any of a myriad of target objectives. For example, in some embodiments, an operational support processing data model 808 is trained based at least in part on device identification data that uniquely identifies networked devices of a communications network (e.g., a dynamic home communications network). Alternatively or additionally, in some embodiments, the operational support processing data model 808 may be trained based at least in part on data embodying historical malfunction classification identifiers that have affected particular communications networks and/or networked devices thereon. In this regard, the historical malfunction classification identifiers may be associated with other particular data (e.g., device activity data, support activity data, and/or the like) that indicates the existence of the malfunction represented by the historical malfunction classification identifier. Additionally or alternatively still, in some embodiments, the operational support processing data model 808 may be trained based at least in part on aggregated data collected for a plurality of communications networks generally, and/or a plurality of communications networks determined similar to a particular home communications network (e.g., the data model trained based at least in part on data associated with another dynamic home communications network that includes similar types of networked devices, similar number of networked devices, similar topology of networked devices, and/or the like). Alternatively or additionally still, in some embodiments, the operational support processing data model 808 may be trained based at least in part on networked device equipment manufacturer provided data (e.g., device OEM data indicating the existence of particular malfunction(s) based on received and/or operational data). In this regard, embodiments of the present disclosure may access any of a myriad of available data repositories internal and/or external to the malfunction support apparatus 200, for example, to retrieve data (e.g., device activity data, support activity data, historical malfunction classification identifiers for malfunction(s) affecting particular networked devices and/or communications networks, and/or the like) used for training the operational support processing data model 808. By accessing such a range of available data, the particular operational support processing data model 808 may be trained based on any relevant portion of such data for maximizing accuracy with respect to a particular target objective (e.g., to maximize the likelihood that a predicted operational support data object is selected that assists in resolving a malfunction identified as affecting or likely to affect a networked device and/or communications network).

Additionally or alternatively, it should be appreciated that the operational support processing data model 808 may be trained utilizing data associated with a myriad of different communications networks, networked devices thereof, and/or the like. For example, in some embodiments, the operational support processing data model 808 is trained based on a training data set include device activity data, support activity data, and/or other data particular to networked devices of one particular communications network. In this regard, the operational support processing data model 808 may be trained to perform particular determinations, detect particular trends, and/or otherwise learn specific aspects of the one communications network (e.g., which data is indicative of a particular malfunction classification identifier, which operational support data object is to be selected based on particular data, and/or the like). Alternatively or additionally, in some embodiments, the operational support processing data model 808 is trained based on a training data set comprising data associated with a plurality of communications networks. In this regard, the operational support processing data model 808 may be trained to perform particular determinations, detect particular trends, and/or otherwise learn generally from the data associated with each communications network (e.g., to identify trends across all data sets, and/or to learn several individual trends associated with each communications network). Similarly, embodiments may particularly select a corpus of training data set(s) that best enable configuring the operational support processing data model 808 for a particular target objective (e.g., user profile specific operational support data object selection, general operational support data object selection based on training data associated with all available communications networks, and/or the like).

Example Processes of the Disclosure

Having described example systems, apparatuses, computing environments, interfaces, and data visualizations of the disclosure, example processes in accordance with the present disclosure will now be described. It will be appreciated that each of the flowcharts depicts an example computer-implemented process that may be performed by one or more of the apparatuses, systems, devices, and/or computer program products described herein, for example utilizing one or more of the specially configured components thereof.

The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 illustrates a flowchart depicting example operations of an example process for applying device activity data and malfunction text description data to an operational support processing data model to select a predicted operational support data object for outputting in accordance with at least some example embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the malfunction support apparatus 200 alone or in communication with one or more other component(s), device(s), system(s), and/or the like. In this regard, in some such embodiments, the malfunction support apparatus 200 is specially configured by computer-coded instructions (e.g., computer program instructions) stored thereon, for example in the memory 204 and/or another component depicted and/or described herein and/or otherwise accessible to the malfunction support apparatus 200, for performing the operations as depicted and described. In some embodiments, the malfunction support apparatus 200 is in communication with one or more external apparatus(es), system(s), device(s), and/or the like, to perform one or more of the operations as depicted and described. For example, the malfunction support apparatus 200 may be in communication with a client device and/or external data system. For purposes of simplifying the description, the process 900 is described as performed by and from the perspective of the malfunction support apparatus 200.

The process 900 begins at optional operation 902. At optional operation 902, the malfunction support apparatus 200 includes means, such as the support provision circuitry 210, the communications circuitry 208, the input/output circuitry 206, the processor 202, and/or the like, or a combination thereof, to receive, via a requesting client device, user input requesting initiating of a malfunction support session. The user input requesting initiation of a malfunction support session may embody and/or include one or more portion(s) of data indicating a user has submitted an explicit request to initiate the malfunction support session and/or other data that may be utilized to initiate the malfunction support session. For example, in some embodiments, the user input includes user submission of support search data and/or other malfunction text description data, and/or the like.

At operation 904, the malfunction support apparatus 200 includes means, such as the support provision circuitry 210, the communications circuitry 208, the input/output circuitry 206, the processor 202, and/or the like, or a combination thereof, to initiate a malfunction support session associated with a requesting client device. In some embodiments, the malfunction support session is initiated associated with a requesting client device from which user input requesting initiation of a malfunction support session was received at an earlier step (e.g., at optional operation 902). In some embodiments, the malfunction support apparatus 200 initiates a malfunction support session and begins attempting to connect the requesting client device with a technician device. Additionally or alternatively, in some embodiments, initiating the malfunction support session may include connecting the requesting client device to, and/or otherwise granting the requesting client device access to, an automated support platform that facilitates information gathering and/ or communication with the requesting client device. For example, in some embodiments, the automated support platform includes or embodies an automated chat bot, artificial intelligence, and/or the like that transmits message data objects to the requesting client device and/or receives message data objects from the requesting client device.

In some embodiments, initiation of a malfunction support session comprises initiating a process for establishing a connection between the requesting client device and a technician device associated with a technical representative. For example, in some embodiments the malfunction support apparatus selects a technical representative from a set of available technical representatives. In some embodiments, the technical representative is selected based at least in part on any of a myriad of parameters, including without limitation based at least in part on availability, technical expertise, work load, and/or the like. Once a technical representative is selected, the connection between the requesting client device and a technician device corresponding to the technical representative may be established immediately, upon a predefined delay, or upon determining a minimum time has passed since initiating the process for establishing the connection (e.g., after a minimum of a determinable number of seconds). In some embodiments, the connection is established directly between the requesting client device and the technician device (e.g., in a peer-to-peer manner, or a client server manner with the requesting client device and client and technician device as server). Alternatively or additionally, in some embodiments, the connection is established indirectly between the requesting client device and the technician device (e.g., utilizing the malfunction support apparatus 200 as an intermediary for transmitting data between the connected devices).

In some embodiments, upon initiation of the malfunction support session associated with the requesting client device, the malfunction support apparatus 200 initiates retrieval and/or gathering of device activity data and/or support activity data associated with the requesting client device, and/or networked devices and/or communications networks associated therewith. For example, in some embodiments, the malfunction support apparatus 200 retrieves and/or gathers device activity data corresponding to networked device(s) and/or communications network(s) associated with a user profile linked to the requesting client device. Alternatively or additionally, in some embodiments, the malfunction support apparatus 200 retrieves and/or gathers device activity data corresponding to networked device(s) and/or communications network(s) with which the requesting client device is connected and/or otherwise communicable. The device activity data may be retrieved from a device activity data repository maintained by the malfunction support apparatus 200, requested and received in response from the requesting client device, detected directly via communication with a communications network, and/or detected indirectly utilizing the requesting client device to communicate with a particular communications network and/or networked device. In some embodiments, for example, the requesting client device and/or one or more other networked device(s) are configured to provide device activity data to the malfunction support apparatus 200 at particular times, upon occurrence of certain trigger event(s), and/or at other determinable circumstances.

At operation 906, the malfunction support apparatus 200 includes means, such as the support provision circuitry 210, the communications circuitry 208, the input/output circuitry 206, the processor 202, and/or the like, or a combination thereof, to correlate device activity data and malfunction text description data to the malfunction support session. In some embodiments, the malfunction text description data is received via the malfunction support session. Alternatively or additionally, in some embodiments, the malfunction text description data is received in response to one or more operations performed via the requesting client device and/or another associated device. For example, in some embodiments the malfunction text description data is received embodying or in conjunction with the user input requesting initiation of a malfunction support session, and/or during the initiated malfunction support session.

At operation 908, the malfunction support apparatus 200 includes means, such as the support provision circuitry 210, the communications circuitry 208, the input/output circuitry 206, the processor 202, and/or the like, or a combination thereof, to apply, in real-time, the device activity data and the malfunction text description data to an operational support processing data model to select a predicted operational support data object from an operational support management repository.

In some embodiments, the malfunction support apparatus 200 maintains the operational support management repository to include any number of operational support data object(s). In some such embodiments, the operational support management repository includes data that enables access to one or more externally stored third-party operational support data object(s). For example, the operational support management repository may include links to third-party operational support data objects that each embody a web resource hosted on a third-party server. In some embodiments, the operational support management repository may be manually maintained (e.g., by one or more database administrators associated with the malfunction support apparatus 200), such that a user may manually store new operational support data object(s) to the operational support management repository, delete operational support data object(s) from the operational support management repository, and/or otherwise configure the operational support data object(s) stored to the operational support management repository. Additionally or alternatively, in some embodiments, the operational support management repository is maintained automatically. For example, the malfunction support apparatus 200 may identify and/or process available internal and/or external data object(s), determine if such resources satisfy one or more applicable conditions for storage as an operational support data object (e.g., whether the content of the data object is associated with resolving a malfunction), and stores the data object as an operational support data object if it is determined that the applicable conditions are met. For example, some embodiments parse, extract, and/or process content data of a particular resource, metadata associated with the resource, and/or the like, or a combination thereof, to automatically generate a corresponding operational support data object based at least in part on such data. Some such embodiments perform the automatic processing to determine whether the resource is determined to resolve or assist in resolving a particular malfunction, and/or a malfunction classification identifier or other data utilized for storing and/or enabling retrieval of the resource with the corresponding malfunction(s). In some other embodiments, a separate, associated operational support management system updates the operational support management repository separate from the malfunction support apparatus 200.

At operation 910, the malfunction support apparatus 200 includes means, such as the support provision circuitry 210, the communications circuitry 208, the input/output circuitry 206, the processor 202, and/or the like, or a combination thereof, to output, in real-time, the predicted operational support data object to the requesting client device. In some embodiments, the malfunction support apparatus 200 transmits the predicted operational support data object to the requesting client device via one or more data transmissions. The malfunction support apparatus 200 may transmit the predicted operational support data object to cause the requesting client device to render, in real-time, a support user interface including at least an interface element associated with the predicted operational support data object. In this regard, the predicted operational support data object may be rendered via the client device sufficiently quickly to enable the predicted operational support data object to be accessed during initiation of the malfunction support session, before the malfunction support session connects the requesting client device with a technician device, and/or during communication between the requesting client device and a technician device as part of the malfunction support session. Alternatively or additionally, in some embodiments, the malfunction support apparatus 200 outputs the predicted operational support data object via transmission of an external message, for example.

FIG. 10 illustrates a flowchart depicting example operations of an example process for terminating initiation of a malfunction support session in accordance with at least some example embodiments of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the malfunction support apparatus 200 alone or in communication with one or more other component(s), device(s), system(s), and/or the like. In this regard, in some such embodiments, the malfunction support apparatus 200 is specially configured by computer-coded instructions (e.g., computer program instructions) stored thereon, for example in the memory 204 and/or another component depicted and/or described herein and/or otherwise accessible to the malfunction support apparatus 200, for performing the operations as depicted and described. In some embodiments, the malfunction support apparatus 200 is in communication with one or more external apparatus(es), system(s), device(s), and/or the like, to perform one or more of the operations as depicted and described. For purposes of simplifying the description, the process 1000 is described as performed by and from the perspective of the malfunction support apparatus 200.

The process 1000 begins at operation 1002. In some embodiments, the process 1000 begins after one or more operations depicted and/or described with respect to any of the other processes described herein. For example, in some embodiments as depicted, the process 1000 begins after execution of operation 910. In this regard, some or all of the process 1000 may replace or supplement one or more blocks depicted and/or described with respect to any of the other processes described herein. Upon completion of the process 1000, the flow of operations may terminate. Additionally or alternatively, as depicted, upon completion of the process 1000, flow may return to one or more operations of another process. It should be appreciated that, in some embodiments, the process 1000 embodies a subprocess of one or more other process(es), such as the process 900.

At operation 1002, the malfunction support apparatus 200 includes means, such as the support provision circuitry 210, the communications circuitry 208, the input/output circuitry 206, the processor 202, and/or the like, or a combination thereof, to receive, via the requesting client device, user input engaging the operational support data object. In some embodiments, for example, user interaction via the requesting client device engages an interface element corresponding to the operational support data object. The resulting user input is transmitted from the requesting client device in response to such user engagement, indicating the user engagement with and/or access of the predicted operational support data object. For example, in some embodiments, the user of the requesting client device may click on and/or otherwise engage the predicted operational support data object in a circumstance where the user determines the predicted operational support data object is likely to enable the user to resolve a particular malfunction affecting one or more networked device(s) accessible to the user.

At operation 1004, the malfunction support apparatus 200 includes means, such as the support provision circuitry 210, the communications circuitry 208, the input/output circuitry 206, the processor 202, and/or the like, or a combination thereof, to terminate initiation of the malfunction support session in response to receiving the user input engaging the operational support data object. The malfunction support apparatus 200 may terminate the malfunction support session in response to the receiving the user input engaging the operational support data object as such user input may indicate an intent to utilize the predicted operational support data object to resolve one or more malfunction(s) instead of utilizing technical support received via the malfunction support session. In some embodiments the malfunction support apparatus 200 terminates searching for a technician device to connect with the requesting client device, and/or terminates pending connections between the requesting client device and a technician device. In circumstances where the malfunction support session has already been initiated, the malfunction support apparatus 200 may terminate the malfunction support session.

In some embodiments, terminating initiation of the malfunction support session comprises termination of one or more subprocesses and/or data connection. For example, in some embodiments, the malfunction support apparatus 200 terminates a process for establishing a connection between the requesting client device and a technician device. Alternatively or additionally, in some embodiments, the malfunction support apparatus terminates a process for searching for a technical representative with which to connect the requesting client device. In some contexts, such as where the malfunction support session has already been initiated and/or a connection is established between the requesting client device and the technician device, the malfunction support apparatus 200 may terminate the malfunction support session and/or the connection between the devices. In such embodiments, the malfunction support apparatus 200 conserves processing resources that would otherwise be expended in establishing and/or maintaining the malfunction support session.

FIG. 11 illustrates a flowchart depicting example operations of an example process for dynamically outputting an updated predicted operational support data object in accordance with at least some example embodiments of the present disclosure. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the malfunction support apparatus 200 alone or in communication with one or more other component(s), device(s), system(s), and/or the like. In this regard, in some such embodiments, the malfunction support apparatus 200 is specially configured by computer-coded instructions (e.g., computer program instructions) stored thereon, for example in the memory 204 and/or another component depicted and/or described herein and/or otherwise accessible to the malfunction support apparatus 200, for performing the operations as depicted and described. In some embodiments, the malfunction support apparatus 200 is in communication with one or more external apparatus(es), system(s), device(s), and/or the like, to perform one or more of the operations as depicted and described. For purposes of simplifying the description, the process 1100 is described as performed by and from the perspective of the malfunction support apparatus 200.

The process 1100 begins at operation 1102. In some embodiments, the process 1100 begins after one or more operations depicted and/or described with respect to any of the other processes described herein. For example, in some embodiments as depicted, the process 1100 begins after execution of operation 910. In this regard, some or all of the process 1100 may replace or supplement one or more blocks depicted and/or described with respect to any of the other processes described herein. Upon completion of the process 1100, the flow of operations may terminate. Additionally or alternatively, as depicted, upon completion of the process 1100, flow may return to one or more operations of another process. It should be appreciated that, in some embodiments, the process 1100 embodies a subprocess of one or more other process(es), such as the process 900.

At operation 1102, the malfunction support apparatus 200 includes means, such as the support provision circuitry 210, the communications circuitry 208, the input/output circuitry 206, the processor 202, and/or the like, or a combination thereof, to receive updated malfunction text description data. In some embodiments, the updated malfunction text description data is received in response to user input updating the malfunction text description data. The updated malfunction text description data may indicate and/or otherwise include additional data associated with operation of one or more networked device(s), operation of a communications network, and/or a malfunction to be resolved. In some embodiments, the updated malfunction text description data may include previously submitted and/or received malfunction text description data in addition to new, additional malfunction text description data.

At operation 1104, the malfunction support apparatus 200 includes means, such as the support provision circuitry 210, the communications circuitry 208, the input/output circuitry 206, the processor 202, and/or the like, or a combination thereof, to apply the device activity data and the updated malfunction text description data to the operational support processing data model. The device activity data and/or updated malfunction text description data are applied to select an updated predicted operational support data object from the operational support management repository. In this regard, the updated predicted operational support data object may embody a different operational support data object that is scored higher by the operational support processing data model based at least in part on the updated malfunction text description data. For example, the updated malfunction text description data may provide more detailed data associated with the malfunction affecting the requesting client device, an associated networked device, and/or the communications network. Accordingly, the operational support processing data model may utilize such additional details to better identify a particular malfunction classification identifier for malfunction(s) affecting the requesting client device, an associated networked device, and/or the communications network.

In some embodiments, the device activity data and the updated malfunction text description data may be applied to the operational support processing data model in real-time upon receiving the updated malfunction text description data. For example, each time updated malfunction text description data is received, the malfunction support apparatus 200 may reapply the device activity data and at least the updated malfunction text description data to the operational support processing data model in real-time. In this regard, the malfunction support apparatus 200 advantageously selects, in real-time, the predicted operational support data object that is determined to most likely address one or more indicated malfunction(s) as additional context is derivable from updated data that is received.

At operation 1106, the malfunction support apparatus 200 includes means, such as the support provision circuitry 210, the communications circuitry 208, the input/output circuitry 206, the processor 202, and/or the like, or a combination thereof, to output, in real-time, the updated predicted operational support data object to the requesting client device. The updated predicted operational support data object may be outputted to the requesting client device in the manner described herein with respect to operation 910. In this regard, a support user interface may be rendered that advantageously includes interface element(s) for access and/or that otherwise represent the updated predicted operational support data object. Such updated rendering ensures the support user interface continues to include at least such interface element(s) for accessing the operational support data object most recently selected as most likely to assist in resolving one or more malfunction(s). The updated predicted operational support data object may be outputted by itself and/or together with one or more previously selected predicted operational support data object(s). Additionally or alternatively, in some embodiments, the updated predicted operational support data object may be rendered within a support user interface in a manner that replaces representation(s) associated with previously selected predicted operational support data object(s), or in a manner that is rendered together with representation(s) one or more previously selected operational support data objects. In this regard, the support user interface advantageously enables a user, for example, to access any of the predicted operational support data objects that the user prefers or determines is most likely to assist in resolving one or more malfunction(s).

FIG. 12 illustrates a flowchart depicting example operations of an example process for applying support search data in accordance with at least some example embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the malfunction support apparatus 200 alone or in communication with one or more other component(s), device(s), system(s), and/or the like. In this regard, in some such embodiments, the malfunction support apparatus 200 is specially configured by computer-coded instructions (e.g., computer program instructions) stored thereon, for example in the memory 204 and/or another component depicted and/or described herein and/or otherwise accessible to the malfunction support apparatus 200, for performing the operations as depicted and described. In some embodiments, the malfunction support apparatus 200 is in communication with one or more external apparatus(es), system(s), device(s), and/or the like, to perform one or more of the operations as depicted and described. For purposes of simplifying the description, the process 1200 is described as performed by and from the perspective of the malfunction support apparatus 200.

The process 1200 begins at operation 1202. In some embodiments, the process 1200 begins after one or more operations depicted and/or described with respect to any of the other processes described herein. For example, in some embodiments as depicted, the process 1200 begins after execution of operation 906. In this regard, some or all of the process 1200 may replace or supplement one or more blocks depicted and/or described with respect to any of the other processes described herein. Upon completion of the process 1200, the flow of operations may terminate. Additionally or alternatively, as depicted, upon completion of the process 1200, flow may return to one or more operations of another process. For example, as depicted, flow may return to operation 908 upon completion of the process 1200. It should be appreciated that, in some embodiments, the process 1200 embodies a subprocess of one or more other process(es), such as the process 900.

At operation 1202, the malfunction support apparatus 200 includes means, such as the support provision circuitry 210, the communications circuitry 208, the input/output circuitry 206, the processor 202, and/or the like, or a combination thereof, to receive support search data associated with the malfunction support session. The support search data may embody malfunction text description data inputted (e.g., by a user or automatically in response to a data-driven process) via the requesting client device that indicates and/or otherwise is associated with a particular malfunction to be resolved. In some embodiments, receiving the support search data by the malfunction support apparatus 200 indicates a request to initiate a malfunction support session, for example associated with resolving a particular malfunction indicated in the support search data. For example, the support search data may include text data representing "cannot connect my printer," which may be processed to indicate a problem with connecting a particular networked device (e.g., a printer) to a home network.

At operation 1204, the malfunction support apparatus 200 includes means, such as the support provision circuitry 210, the communications circuitry 208, the input/output circuitry 206, the processor 202, and/or the like, or a combination thereof, to apply the support search data to the operational support processing data model to select the predicted operational support data object. In this regard, the malfunction support apparatus 200 may apply the support search data as malfunction text description data and/or other support activity data to the operational support processing data model in the manner described with respect to operation 908.

FIG. 13 illustrates a flowchart depicting example operations of an example process for training an operational support processing data model in accordance with at least some example embodiments of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the malfunction support apparatus 200 alone or in communication with one or more other component(s), device(s), system(s), and/or the like. In this regard, in some such embodiments, the malfunction support apparatus 200 is specially configured by computer-coded instructions (e.g., computer program instructions) stored thereon, for example in the memory 204 and/or another component depicted and/or described herein and/or otherwise accessible to the malfunction support apparatus 200, for performing the operations as depicted and described. In some embodiments, the malfunction support apparatus 200 is in communication with one or more external apparatus(es), system(s), device(s), and/or the like, to perform one or more of the operations as depicted and described. For purposes of simplifying the description, the process 1300 is described as performed by and from the perspective of the malfunction support apparatus 200.

The process 1300 begins at operation 1302. In some embodiments, the process 1300 begins after one or more operations depicted and/or described with respect to any of the other processes described herein. In this regard, some or all of the process 1300 may replace or supplement one or more blocks depicted and/or described with respect to any of the other processes described herein. Upon completion of the process 1300, the flow of operations may terminate. Additionally or alternatively, as depicted, upon completion of the process 1300, flow may return to one or more operations of another process. For example, as depicted, flow may return to operation 902 upon completion of the process 1300. It should be appreciated that, in some embodiments, the process 1300 embodies a subprocess of one or more other process(es), such as the process 900.

At operation 1302, the malfunction support apparatus 200 includes means, such as the support provision circuitry 210, the communications circuitry 208, the input/output circuitry 206, the processor 202, and/or the like, or a combination thereof, to identify an operational support data object set. In some embodiments, the malfunction support apparatus 200 identifies the operational support data object set from an operational support management repository that stores such operational support data objects. The malfunction support apparatus 200 may query the operational support management repository for all stored operational support data object(s), and/or a portion thereof, to identify the operational support data object set. In some embodiments, the malfunction support apparatus 200 maintains and/or otherwise controls the operational support management repository. In other embodiments, the operational support management repository is maintained by a separate and/or associated system, and the malfunction support apparatus 200 identifies the operational support data object set by accessing the operational support management repository.

At operation 1304, the malfunction support apparatus 200 includes means, such as the support provision circuitry 210, the communications circuitry 208, the input/output circuitry 206, the processor 202, and/or the like, or a combination thereof, to identify training device activity data. In some embodiments, the malfunction support apparatus 200 identifies the training device activity data from a device activity data repository that includes historical device activity data associated with any number of networked device(s), user profile(s), communications network(s), and/or the like. The device activity data repository may be maintained by the malfunction support apparatus 200 and/or one or more associated system(s). For example, in some embodiments, the malfunction support apparatus 200 stores received and/or otherwise detected device activity data in the device activity data repository over time for any of a myriad of networked device(s), communications network(s), and/or the like. Alternatively or additionally, in some embodiments, a separate data system associated with the malfunction support apparatus 200 maintains the device activity data repository, for example by receiving, requesting, and/or otherwise detecting device activity data associated with one or more networked device(s), communications network(s), and/or the like.

In some embodiments, the training device activity data includes association(s) between one or more portion(s) of the historical device activity data and malfunction classification identifier(s) with which such portion(s) were associated. In this regard, such association(s) may be embodied by manually entered and/or automatically determined label(s) linked to the relevant portion(s) of device activity data that indicate the malfunction classification identifier(s) with which the portion(s) of device activity data are associated.

At operation 1306, the malfunction support apparatus 200 includes means, such as the support provision circuitry 210, the communications circuitry 208, the input/output circuitry 206, the processor 202, and/or the like, or a combination thereof, to train the operational support processing data model for selecting an operational support data object from the operational support data object set based at least in part on the training device activity data. In some embodiments, the operational support processing data model is trained to select operational support data object(s) that are associated with a malfunction classification identifier(s) determined as most likely representing a malfunction affecting a networked device, communications network, and/or the like represented in and/or associated with the device activity data. In some embodiments, the operational support processing data model is trained based on additional training data, such as training support activity data, training malfunction text description data, and/or the like.

In some embodiments, the operational support processing data model may be trained for identifying a possible malfunction classification identifier set based at least on the training device activity data set. For example, the operational support processing data model may process the training device activity data, alone and/or in conjunction with one or more other portion(s) of training data, such as training malfunction text description data and/or other training support activity data, to configure hyperparameters and/or other configurable settings of the operational support processing data model based on trends, patterns, and/or values represented in the training data. The operational support processing data model may be trained to score various malfunction classification identifier(s) and select predicted operational support data object(s) associated with the highest scoring malfunction classification identifier(s), and/or associated with the scoring malfunction classification identifier(s) exceeding a particular score threshold.

Alternatively or additionally, in some embodiments, the operational support processing data model may be trained to score various operational support data objects associated with a particular malfunction classification identifier. In this regard, the score generated for each operational support data object may represent a confidence level of the system that the operational support data object would assist in resolving a malfunction represented by the particular malfunction classification identifier. The operational support processing data model may be trained to score each operational support data object associated with a particular malfunction classification identifier and select the highest scoring operational support data object for outputting as the predicted operational support data object. Alternatively, or additionally, in some embodiments, the operational support processing data model is trained to score each operational support data object associated with a particular malfunction classification identifier and select all operational support data object(s) that satisfy a particular score threshold as predicted operational support data object(s).

In some embodiments, the operational support processing data model may additionally or alternatively associate each possible malfunction classification identifier of the possible malfunction classification identifier set with at least a portion of the operational support data object set. For example, the operational support processing data model may process each operational support data object of the operational support data object set to identify possible malfunction classification identifier(s) associated with the operational support data object (e.g., possible malfunction classification identifier(s) representing malfunction(s) that the operational support data object may assist with resolving).

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Non-Limiting Example Embodiments of the Disclosure

Having described various aspects of the innovations, it will be appreciated that various embodiments are described herein. The subject matter described herein includes, without limitation, the following specific embodiments. These embodiments are merely examples and should not be construed as limiting the scope of the disclosure. It will be appreciated that the embodiments in some aspects are freely combinable. In other aspects of the present disclosure, each embodiment is independent from other embodiments described.

Embodiment 1. A computer-implemented method comprising:
  initiating a malfunction support session associated with a requesting client device;
  correlating device activity data and malfunction text description data to the malfunction support session;
  applying, in real-time, the device activity data and the malfunction text description data to an operational support processing data model to select the predicted operational support data object from the system operational support management repository, wherein the operational support processing data model is trained based on training device activity data and malfunction history data from the system operational support management repository; and
  outputting, in real-time, the predicted operational support data object to the requesting client device.

Embodiment 2: The computer-implemented method according to any one of the Embodiments 1, further comprising:
  receiving, via the requesting client device, user input requesting initiation of the malfunction support session, wherein the predicted operational support data object is outputted in response to receiving the user input requesting initiation of the malfunction support session.

Embodiment 3: The computer-implemented method according to any one of the Embodiments 1-2, further comprising:
  receiving, via the requesting client device, user input engaging the operational support data object; and
  terminating initiation of the malfunction support session in response to receiving the user input engaging the operational support data object.

Embodiment 4: The computer-implemented method according to any one of the Embodiments 1-3, further comprising:
  terminating the process for establishing the connection between the requesting client device and the technician device in response to receiving the user input engaging the operational support data object.

Embodiment 5: The computer-implemented method according to any one of the Embodiments 1-4, further comprising:
  receiving updated malfunction text description data in response to user input updating the malfunction text description data;
  automatically applying, in real-time, the device activity data and the updated malfunction text description data to the operational support processing data model upon receiving malfunction text description data to select an updated predicted operational support data object from the system operational support management repository; and
  outputting the updated predicted operational support data object to the requesting client device.

Embodiment 6: The computer-implemented method according to any one of the Embodiments 1-5, further comprising:
  receiving support search data associated with the malfunction support session,
  wherein the support search data is further applied to the operational support processing data model to select the predicted operational support data object.

Embodiment 7: The computer-implemented method according to any one of the Embodiments 1-6, wherein outputting, in real-time, the predicted operational support data object to the requesting client device comprises:
  causing rendering, to the requesting client device, of a support user interface comprising a first sub-interface associated with a main support transmission process and a second sub-interface comprising the predicted operational support data object.

Embodiment 8: The computer-implemented method according to any one of the Embodiments 1-7, further comprising:
  identifying an operational support data object set;
  identifying a training device activity data; and
  training the operational support processing data model for:
    identifying a possible malfunction classification identifier set based at least on the training device activity data; and
    associating each possible malfunction classification identifier of the possible malfunction classification identifier set with at least a portion of the operational support data object set.

Embodiment 9: The computer-implemented method according to any one of the Embodiments 1-8, wherein the dynamic home communication network comprises a plurality of networked devices associated with a plurality of networked device types, and wherein the operational support processing data model selects the predicted operational support data object based at least in part on the plurality of networked device types.

Embodiment 10: The computer-implemented method according to any one of the Embodiments 1-9, wherein the device activity data is indicates a plurality of malfunctions represented by a plurality of malfunction classification identifiers, and wherein the predicted operational support data object is associated with a first malfunction classification identifier representing a first malfunction of the plurality of malfunctions that contributes to each other malfunction of the plurality of malfunctions.

Embodiment 11: The computer-implemented method according to any one of the Embodiments 1-10, further comprising:
    identifying a user profile associated with the requesting client device; and
    determining, based at least in part on the user profile, the device activity data comprising at least device identification data for one or more networked devices associated with the dynamic home communications network.

Embodiment 12: The computer-implemented method according to any one of the Embodiments 1-11, wherein initiating the malfunction support session associated with the requesting client device comprises:
    initiating a process for establishing a connection between the requesting client device and a technician device associated with a technical representative, wherein the predicted operational support data object is output before establishing the connection.

Embodiment 13: A computer-implemented method according to any combination of the Embodiments 1-12.

Embodiment 14: An apparatus comprising at least one processor and at least one non-transitory memory having computer program code stored thereon that, in execution with the at least one processor, causes the apparatus to perform any one of the computer-implemented methods of Embodiments 1-13.

Embodiment 15: A computer program product comprising at least one non-transitory computer-readable storage medium having computer program code stored thereon that, in execution with at least one processor, configures the computer program product to perform any one of the computer-implemented methods of Embodiments 1-13.

What is claimed is:

1. A system for using device activity data from a dynamic home communication network to predict a predicted operational support data object from an operational support management repository, the system comprising at least one processor and at least one memory having computer-coded instructions stored thereon, wherein the computer-coded instructions in execution with the at least one processor cause the system to:
    initiate a malfunction support session associated with a requesting client device;
    during a support session initiation period:
        correlate device activity data and malfunction text description data to the malfunction support session;
        predict, in real-time by applying the device activity data and the malfunction text description data to an operational support processing machine learning model, the predicted operational support data object from a plurality of previously stored operational support data objects stored in the operational support management repository; wherein predicting the predicted operational support data object comprises determining, via the operational support processing machine learning model, that the predicted operational support data object has a highest likelihood of resolving the malfunction of the plurality of previously stored operational support data objects; the operational support management repository comprising an existing data repository storing at least the plurality of previously stored operational support data objects prior to the prediction of the predicted operational support data object;
        cause rendering, to the requesting client device, of a support user interface comprising a first sub-interface and a second sub-interface, wherein the first sub-interface comprises a waiting message interface element corresponding to a main support transmission process;
        output, in real-time, the predicted operational support data object to the requesting client device by rendering, in the second sub-interface an operational support interface element corresponding to the predicted operational support data object; and
        in an instance in which a user selection of the operational support interface element corresponding to the predicted operational support data object is received, terminate initiation of the malfunction support session in response to receiving the user selection of the operational support interface element corresponding to the predicted operational support data object.

2. The system according to claim 1, the system further caused to:
    receive, via the requesting client device, user input requesting initiation of the malfunction support session, wherein the predicted operational support data object is outputted in response to receiving the user input requesting initiation of the malfunction support session.

3. The system according to claim 1, the system further caused to:
    receive updated malfunction text description data in response to user input updating the malfunction text description data;
    automatically apply, in real-time, the device activity data and the updated malfunction text description data to the operational support processing machine learning model upon receiving malfunction text description data to predict an updated predicted operational support data object from the operational support management repository; and
    output the updated predicted operational support data object to the requesting client device.

4. The system according to claim 1, the system further configured to:
    receive support search data associated with the malfunction support session,
    wherein the support search data is further applied to the operational support processing machine learning model to predict the predicted operational support data object.

5. The system according to claim 1, the system further caused to:
    identify an operational support data object set;
    identify training device activity data; and
    train the operational support processing machine learning model to:
        identify a possible malfunction classification identifier set based at least on the training device activity data; and
        associate each possible malfunction classification identifier of the possible malfunction classification identifier set with at least a portion of the operational support data object set.

6. The system according to claim 1, wherein the dynamic home communication network comprises a plurality of networked devices associated with a plurality of networked device types, and wherein the operational support processing machine learning model predicts the predicted operational support data object based at least in part on the plurality of networked device types.

7. The system according to claim 6, wherein the plurality of networked devices comprises an active network device set and an inactive networked device set.

8. The system according to claim 1, wherein the device activity data indicates a plurality of malfunctions represented by a plurality of malfunction classification identifiers, and wherein the predicted operational support data object is associated with a first malfunction classification identifier representing a first malfunction of the plurality of malfunctions that contributes to each other malfunction of the plurality of malfunctions.

9. The system according to claim 1, the system further caused to:
identify a user profile associated with the requesting client device; and
determine, based at least in part on the user profile, the device activity data comprising at least device identification data for one or more networked devices associated with the dynamic home communications network.

10. The system according to claim 1, wherein the predicted operational support data object is accessed via the requesting client device, wherein the predicted operational support data object comprises a link that, upon accessing, causes the requesting client device to retrieve a third-party operational support data object corresponding to the link via an external system.

11. The system according to claim 1, the system further caused to:
train the operational support processing machine learning model based at least in part on training the device activity data and malfunction history data from the operational support management repository.

12. The system according to claim 1, the system further caused to:
receive malfunction trending data associated with the malfunction support session, wherein the malfunction trending data is further applied to the operational support processing machine learning model to predict the predicted operational support data object.

13. The system according to claim 1, the system further caused to:
receive support search data via a search interface element rendered on the first sub-interface;
predict, by applying the device activity data and the support search data to the operational support processing machine learning model, an updated predicted operational support data object from the plurality of previously stored operational support data objects stored in the operational support management repository;
generate a second operational support interface element corresponding to the updated predicted operational support data object; and
cause the second sub-interface to be updated to display the second operational support interface element.

14. The system according to claim 1, the system further caused to:
after initiation of the malfunction support session:
receive updated malfunction text description data via the first sub-interface;
predict, by applying the device activity data and the updated malfunction text description data to the operational support processing machine learning model, an updated predicted operational support data object from the plurality of previously stored operational support data objects stored in the operational support management repository
generate a second operational support interface element corresponding to the updated predicted operational support data object; and
cause the second sub-interface to be updated to display the second operational support interface element.

15. A computer-implemented method of using device activity data from a dynamic home communication network to predict a predicted operational support data object from an operational support management repository, the computer-implemented method comprising:
initiating a malfunction support session associated with a requesting client device;
during a support session initiation period:
correlating device activity data and malfunction text description data to the malfunction support session;
predicting, in real-time by applying the device activity data and the malfunction text description data to an operational support processing machine learning model, the predicted operational support data object from a plurality of previously stored operational support data objects stored in the operational support management repository; wherein predicting the predicted operational support data object comprises determining, via the operational support processing machine learning model, that the predicted operational support data object has a highest likelihood of resolving the malfunction of the plurality of previously stored operational support data objects; the operational support management repository comprising an existing data repository storing at least the plurality of previously stored operational support data objects prior to the prediction of the predicted operational support data object;
causing rendering, to the requesting client device, of a support user interface comprising a first sub-interface and a second sub-interface, wherein the first sub-interface comprises a waiting message interface element corresponding to a main support transmission process;
outputting, in real-time, the predicted operational support data object to the requesting client device by rendering, in the second sub-interface an operational support interface element corresponding to the predicted operational support data object; and
in an instance in which a user selection of the operational support interface element corresponding to the predicted operational support data object is received, terminating initiation of the malfunction support session in response to receiving the user selection of the operational support interface element corresponding to the predicted operational support data object.

16. A computer program product for using device activity data from a dynamic home communication network to predict a predicted operational support data object from an operational support management repository, the computer program product comprising at least one non-transitory computer-readable storage medium having computer program code stored thereon that, in execution with at least one processor, configures the computer program product for:
initiating a malfunction support session associated with a requesting client device;
during a support session initiation period:
correlating device activity data and malfunction text description data to the malfunction support session;
predicting, in real-time by applying the device activity data and the malfunction text description data to an operational support processing machine learning model, the predicted operational support data object from a plurality of previously stored operational support data objects stored in the operational support management repository; wherein predicting the predicted operational support data object comprises determining, via the operational support processing machine learning model, that the predicted operational support data object has a highest likelihood of resolving the malfunction of the plurality of previously stored operational support data objects; the operational support management repository comprising an existing data repository storing at least the plurality of previously stored operational support data objects prior to the prediction of the predicted operational support data object;

causing rendering, to the requesting client device, of a support user interface comprising a first sub-interface and a second sub-interface, wherein the first sub-interface comprises a waiting message interface element corresponding to a main support transmission process;

outputting, in real-time, the predicted operational support data object to the requesting client device by rendering, in the second sub-interface an operational support interface element corresponding to the predicted operational support data object; and in an instance in which a user selection of the operational support interface element corresponding to the predicted operational support data object is received, terminating initiation of the malfunction support session in response to receiving the user selection of the operational support interface element corresponding to the predicted operational support data object.

\* \* \* \* \*